(12) United States Patent
Linden et al.

(10) Patent No.: US 7,266,303 B2
(45) Date of Patent: Sep. 4, 2007

(54) HANDLING INFORMATION IN A NOISY ENVIRONMENT

(75) Inventors: Noah Linden, Bristol (GB); Sandu Popescu, Bristol (GB); Nicholas Robert Gisin, Vessy (CH); Serge Alexandre Massar, Brussels (BE)

(73) Assignee: Universite Libre de Bruxelles, Brussels (BE)

( * ) Notice: Subject to any disclaimer, the term of this patent is extended or adjusted under 35 U.S.C. 154(b) by 662 days.

(21) Appl. No.: 10/398,637

(22) PCT Filed: Oct. 2, 2001

(86) PCT No.: PCT/GB01/04392

§ 371 (c)(1),
(2), (4) Date: Sep. 29, 2003

(87) PCT Pub. No.: WO02/30030

PCT Pub. Date: Apr. 11, 2002

(65) Prior Publication Data

US 2004/0042715 A1    Mar. 4, 2004

Related U.S. Application Data

(60) Provisional application No. 60/235,527, filed on Oct. 4, 2000.

(51) Int. Cl.
*H04B 10/08*    (2006.01)
*H04B 10/00*    (2006.01)

(52) U.S. Cl. .......................... 398/140; 398/158; 398/26; 398/27

(58) Field of Classification Search .................. 398/26, 398/27, 98, 140, 158, 192, 194
See application file for complete search history.

(56) References Cited

U.S. PATENT DOCUMENTS 6,128,764 A * 10/2000 Gottesman .................. 714/785

(Continued)

OTHER PUBLICATIONS

Bennett, C.H., et al. "Eavesdrop-Detecting Quantum Communications Channel," IBM Technical Disclosure Bulletin, IBM Corp. New York, New York, U.S.A. vol. 26, No. 8, Jan. 1984, pp. 4363-4366. XP000759667, ISSN: 0018-8689.

(Continued)

*Primary Examiner*—Dalzid Singh
(74) *Attorney, Agent, or Firm*—Blakely, Sokoloff, Taylor & Zafman; Stephen M. De Klerk

(57) ABSTRACT

A method and system for handling information in a noisy environment in the form of at least one information carrying mode is disclosed. A plurality of encoded modes are generated by linear transformation of the information carrying mode, said encoded modes being provided on respective independent channels. The encoded modes are linearly combined to generate at least one decoded mode. A set of receiver channels is provided for receiving the decoded mode wherein one of said set of receiver channels is designated as a useful channel, and a useful signal is supplied as the decoded mode if it is received on the useful channel an discarded if it is received on the other receiver channels of the set, wherein the useful signal represents said information substantially uncorrupted by noise. The technique is applicable to quantum, classical or mesoscopic environments. The invention also provides a method and system for generating correlated states using a similar filtration technique. The invention is particularly useful when applied to data communications or data storage.

43 Claims, 13 Drawing Sheets

U.S. PATENT DOCUMENTS 6,314,189 B1 * 11/2001 Motoyoshi et al. ......... 380/278
6,438,234 B1 * 8/2002 Gisin et al. ................. 380/256
2002/0048059 A1 * 4/2002 Azuma ....................... 359/107

OTHER PUBLICATIONS

Barnum, Howard, et al. "Information transmission through a noisy quantum channel," Physical Review A; Atomic, Molecular, and Optical Physics. The American Physical Society, Woodbury, New York, U.S.A. vol. 57, No. 7, Jun. 1998, pp. 4153-4175. XP002204345.

* cited by examiner

HANDLING INFORMATION IN A NOISY ENVIRONMENT

CROSS-REFERENCE TO OTHER APPLICATIONS

This Application is a National Phase of International Application No. PCT/GB01/04392 filed on Oct. 2, 2001, which claims priority from U.S. Provisional Patent Application No. 60/235,527, filed on Oct. 4, 2000.

FIELD OF THE INVENTION

The present invention relates to a method and system for handling information in a noisy environment, and also to a method and system for generating correlated particle states in a noisy environment.

BACKGROUND TO THE INVENTION

The last five years has seen the emergence of the new field of quantum information processing. The behaviour of individual microscopic particles—atoms, electrons and photons etc., which is described by the theory of quantum mechanics, is completely different from the behaviour of macroscopic objects made of large numbers of such particles. The key realisation which led to the emergence of the field is that quantum mechanics allows the processing of information in fundamentally new ways. This offers the possibility of immense advantages over current information processing technologies which are all essentially based on classical mechanics.

Specific tasks for which it has been proven that quantum information processing offers advantages over classical information processing include:

Communication. In certain circumstances quantum communication is more powerful than classical communication. For instance the amount of quantum communication required to perform certain computational tasks can be significantly smaller than the amount of classical communication. (This aspect is known as communication complexity.) Quantum communication also allows novel, and in principle unbreakable, cryptographic schemes.

Computation. A computer that runs according to the rules of quantum mechanics can perform certain computations faster than a classical computer. In particular there has been described a quantum algorithm for factorising integers which is exponentially faster than any known classical algorithm.

Just as in classical information processing, errors occur in quantum information processing, and these have to be corrected. However quantum errors are fundamentally different in character from classical errors, and the correction of quantum errors requires new techniques.

When quantum communication was first proposed it was felt that interactions of the system with the environment, and the consequent loss of information into the environment, would produce errors in communication which would be un-correctable even in principle (i.e. it was felt that quantum error-correction would be ruled out by the laws of quantum mechanics). However it was shown in 1995-96, using two different approaches, that quantum error correction was in fact possible.

On the one hand it was shown in C H Bennett, et al, Phys Rev Lett 76 (1996) 722, that entanglement could be protected against decoherence with the environment. The basic idea of this scheme known as entanglement purification, is that from several impure entangled states one can obtain, using only local operations and classical communication, a smaller number of states with higher entanglement. These entangled states can then be used in communication protocols, for example teleportation.

On the other hand it was shown by P W Shor, Method for reducing decoherence in a quantum computer memory, U.S. Pat. No. 5,768,297; P W Shor, Phys Rev A, 52 (1995) R2493 and A M Steane, Phys Rev Lett, 77 (1996) 793, that a quantum memory could be protected against interactions with the environment. The basic idea in this case is to encode each logical quantum bit (qubit) in an entangled superposition of several qubits. The encoded state is chosen in such a way that if a small number of errors affect the individual qubits in the superposition, the errors do not destroy the encoded qubit.

The connections between these two results were studied in C H Bennett, D P DiVincenzo, J A Smolin, W K Wootters, Phys Rev, A54 (1996) 3824-3851, by exploiting the fact that a memory can be viewed as a communication scheme in which the communication takes place in time rather than in space. In particular it was shown in C H Bennett, D P DiVincenzo, J A Smolin, W K Wootters, Phys Rev, A54 (1996) 3824-3851, that a protocol for purification of entanglement that uses only one way classical communication can be mapped into a protocol for the protection of a quantum memory against decoherence. Shor-Steane codes can also be used for error correction for communication by first encoding the qubits using Shor-Steane codes, sending the qubits through the noisy channel and then decoding.

These results subsequently led to the proof that one could in principle realise fault tolerant quantum computation as described in P W Shor, Proc 37th Symposium on the Foundations of Computer Science (Los Alamitos, Calif.; IEEE Comp Sci Press, (1996) p 15.

In all the above work the authors were not concerned with technological feasibility, but rather with proving a point of principle. These protocols are relevant for multi-particle quantum systems and for errors which act locally on the individual particles. The primary difficulty with all these protocols is that in order to be implemented they require controlled interactions between many particles. This is technically impossible at present and is likely to remain so in the foreseeable future.

Braunstein in Nature 394 (1998), 47 and Lloyd and Slotine in Phys Rev Letters 80 (1998), 4088, have proposed methods for implementing Shor-Steane error correction protocols without multi-particle interactions. Their methods are based on the use of continuous quantum variables for quantum logic (to be opposed to the discrete variables, for instance qubits, used in earlier work). The quadratures of the electromagnetic field provide a convenient realisation of such variables. It was shown in Phys Rev. Letters 90 (1998) 4084, that quantum error correction codes could be generalised to continuous quantum variables. These methods apply to a particular physical system, namely light, and require the use of a special type of quantum states: squeezed states of light. Highly squeezed states, which are needed for the Braunstein and Lloyd and Slotine protocols are technologically difficult to prepare and maintain. Furthermore these protocols use active detection of errors and active error correction.

Bouwmeester in quant-ph/006108 has an alternative communication protocol. His method relies on distributing a standard entangled state (a singlet) between two parties. The protocol is limited to correcting classical-type commuting errors (such as spin-flips) when the state propagates through a noisy channel. It does not correct the arbitrary interactions with the environment which occur in the framework used by Bouwmeester. Furthermore the Bouwmeester protocol avoids multi-particle interactions at the expense of using sources which emit very special states (of GHZ-type). Even in the simplest case of correction of a single spin-flip on one party of a singlet propagating through a noisy channel, such sources are at the current limit of technology. Correction of more spin-flip errors requires sources which are beyond the limits of current technology.

It is an aim of the present invention to provide a method and system for handling information which will remove errors introduced by noise. The aim is to provide a method and system which is widely applicable not only to quantum information but also to classical wave signals.

According to one aspect of the present invention there is provided a method of handling information in a noisy environment in the form of at least one information carrying mode, comprising the steps of generating a plurality of encoded modes by linear transformation of the information carrying mode, said encoded modes being provided on respective independent channels; linearly combining the encoded modes to generate at least one decoded mode; providing a set of receiver channels for receiving the decoded mode wherein one of said set of receiver channels is designated as a useful channel; and supplying as a useful signal the decoded mode if it is received on the useful channel and discarding the decoded mode if it is received on the other receiver channels of the set, wherein the useful signal represents said information substantially uncorrupted by noise.

According to another aspect of the invention there is provided a system for handling information in a noisy environment in the form of at least one information carrying mode, the system comprising: means for generating a plurality of encoded modes by linear transformation of the information carrying mode, said encoded modes being provided on respective independent channels; means for linearly combining the encoded modes to generate at least one decoded mode; a set of receiver channels for receiving the at least one decoded mode wherein one of said set of receiver channels is designated as a useful channel; and means for supplying as a useful signal the decoded mode if it is received on the useful channel and discarding the decoded mode if it is received on the other receiver channels of the set, wherein the useful signal represents said information substantially uncorrupted by noise.

The word "mode" used herein applies equally well to systems described by classical or quantum mechanics. In the quantum case it is used, according to its standard meaning in the second quantized description of quantum systems, to denote a set of states, including states with zero, one, two or more particles. In quantum mechanics, one can get superpositions of such states. Thus a first information carrying mode can provide a set of states of no particles in mode 1, one particle in mode 1, etc. In quantum mechanics, a mode can be populated by less than one particle in the sense that the state of the mode can be a superposition of the state with no particles and the state of one particle, for example. In the case of classical wave systems, the word "mode" refers to a basic solution of the appropriate wave equation.

In describing our inventions, we make use of two standard ways of treating quantum systems: the first and second quantization languages. The language of second quantization is more general and can be used in all situations for systems containing any number of particles. Hence all the quantum protocols in this document could have been described in the second quantized language (using the notions of quantum modes, creation and annihilation operators etc.). The first quantization language is, however, more convenient and simpler for systems containing a fixed number of particles. In this document both languages are used, according to which one seems simplest in the given situation.

A key element of our protocols is that the encoding and decoding operations are realised by "linear" transformations. In the case of quantum systems, by linear we mean that the effective interaction implementing the encoding and decoding, as it applies to the space of states we are interested in, is linear; i.e. its effect on the creation operators associated to the quantum modes (in the second quantized language) is such that they undergo linear transformations (for other states, outside the space of states in which we are interested, the true interaction may be non-linear, but this is irrelevant for our protocols). In particular this means that all our single particle and entanglement distribution protocols are linear, by definition. In the context of classical waves, the equivalent notion is that the classical modes undergo linear transformation.

Where an information carrying mode is populated by at least one particle, the encoded modes can be thought of as a plurality of states of the particle which, once generated, can be linearly combined to reconstitute the at least one particle. When one particle is reconstituted, it is detectable at only one of the receiver channels, which may or may not be the useful channel. In that scenario, the useful signal is constituted by particles which are detected on the useful channel, while particles detected on the other receiver channels are discarded.

The term "useful channel" is used to denote those of the receiver channels at which any particle which arrives is in a good, substantially noise free state. As explained later, the underlying theory indicates that particles which arrive on the useful channel will constitute a useful, substantially noise free signal. Some particles will not arrive at the useful channel. The probability of particles appearing in the useful channel is linked to the noise level. Thus, by using the technique of the present invention it is possible to utilise the signal which appears at the useful channel on the basis that it is substantially noise free. Conversely, particles/signals appearing on the other channels are completely ignored or "discarded". That is, those particles are not used in the output signal or used to modify it.

By the phrase "substantially uncorrupted by noise", it is meant that the signal contains substantially the same information as in its original state. The invention is particularly suitable for the removal of noise in cases where the noise on each channel is independent of that on any other channel.

It is indicated above that the useful signal "represents" the original information substantially uncorrupted by noise. That is, the information can be recovered in a form substantially identical to its original form, but with reduced amplitude/power (representing the fact that a part of the original signal has been discarded). However it is also possible for the signal which is received to be a modified version of the original information, by virtue of the fact that the channels have been subject to a linear or logical manipulation between the encoding and decoding.

It will be appreciated that the invention is applicable to communication and/or storage as discussed in more detail in the following.

The invention has several important facets.

No multi-particle interactions are needed to provide a substantially noise free particle or signal. This is particularly important since at the present time controlled inter-particle interaction is technologically unfeasible.

Moreover, the encoding and combining steps can be carried out by passive transformations. It had earlier not been thought possible to eliminate noise using only passive transformations.

According to another aspect of the present invention there is provided a communication system for transmitting information in a noisy environment comprising: an input for receiving a physical information signal in the form of a wave; a splitter for splitting the signal into a plurality of transmission components; a plurality of transmission paths, each carrying a respective transmission component; a combiner for combining the transmission components and generating a set of output signals on respective output channels, wherein one of said output channels is designated as a useful channel; a detector for detecting the output signal on the useful channel, wherein the output signals on the other output channels are discarded and wherein the output signal on the useful channel contains said information substantially uncorrupted by noise.

A further aspect provides an optical communications system for transmitting information in a noisy environment, comprising: an input for receiving an optical information signal; a splitter for splitting the optical information signal into a plurality of optical beams; a combiner for combining the optical beams and for generating a set of separated optical output signals, one of said signals being designated as a useful signal; and a detector located to pick up the useful output signal, wherein the other output signal are discarded.

The invention can also be used to generate particle states correlated to a predetermined degree. According to this aspect there is provided a method of generating particle states correlated to a predetermined degree at separated locations in a noisy environment, the method comprising: generating a first set of transmission sub-states of a first particle and a second set of transmission sub-states of a second particle, the transmission sub-states representing a greater degree of correlations than the predetermined degree; transmitting the first set of transmission sub-states on respective ones of a first plurality of independent transmission channels; transmitting the second set of transmission sub-states on respective ones of a second plurality of independent transmission channels; combining the first set of transmission sub-states to generate receiver states of the first particle on respective ones of a first set of output channels; combining the second set of transmission sub-states to generate receiver states of the second particle on respective ones of a second set of output channels; determining whether or not to use or discard the states of the first and second particles depending on the output channels in which they arrive, wherein the states of the first and second particles which are determined to be used are available on corresponding channels of the first and second sets and are correlated to said predetermined degree.

Another aspect provides a system for generating particle states correlated to a predetermined degree at separated locations in a noisy environment, the system comprising: a source configured to generate a first set of transmission substates of a first particle and a second set of transmission sub-states of a second particle, the transmission substates representing a greater degree of correlation than the predetermined degree; a first plurality of transmission paths arranged between the source and a first decoder for conveying respectively the first set of transmission sub-states; a second plurality of transmission paths arranged between the source and a second decoder for conveying respectively the second set of transmission sub-states; wherein the first decoder is operable to combine the transmission sub-states to generate receiver states of the first particle on respective ones of a first set of output channels; wherein the second decoder is operable to combine the transmission substates to generate receiver states of the second particle on respective ones of a second set of output channels; and means for determining whether or not to use or discard the states of the first and second particles depending on the output channels in which they arrive, wherein the states of the first and second particles which are determined to be used are available on corresponding channels of the first and second sets and are correlated to said predetermined degree.

By way of explanation, consider the case where first and second receivers are located to receive signals from the first and second decoders respectively. The correlated states will appear on corresponding channels. That is, if the first receiver uses channels 1 and 3 then the second receiver should use 1 and 3. If the first receiver uses channels 2 and 4 then the second receiver should use 2 and 4. However, the receivers do not need to positively detect at this point which channels the particles appeared in. Indeed, doing the detection at this point in such a way that the state is not disturbed may in fact be difficult technologically. Therefore, the determining means may operate to determine if the particles are in channels 1 and 3, for example, without disturbing them if they are there, by measuring if any particle appears in any of the channels 2 or 4 on either side. If they do not appear in channels 2 or 4, they are in channels 1 and 3 and the protocol can continue. If they do appear in channels 2 or 4, the protocol is aborted (because the state has been disturbed by the measurement).

The second possibility is for a positive detecting step to occur a long way down the line. Thus in practice it could be anticipated that the receivers may well use all four channels on each side blindly (in a four channel system), that is performing operations as if there were a particle on the channel but without knowing (or needing to know) whether there actually is a particle in the channel or not. At the very end of the processing, users can detect where the particles are and use the results only if they came through coincident channels with correlated particles (i.e. 1 and 3 in both cases, or 2 and 4 in both cases).

It will be appreciated that throughout the specification "particles" are discussed. When a single particle is mentioned it is clear that it is not possible to guarantee that in practice the source produces exactly one particle because a source might not be perfect. Moreover, when linear transformations are referred to, it cannot be guaranteed in the real world that each piece of hardware performs a perfect linear transformation. However, the fact that the mathematical perfections do not find themselves realised in the real world does not detract from the fundamental usefulness of the systems and method discussed herein.

It will be appreciated that correlation between states can be provided with a number of factors, including correlation in time and/or polarisation. Both of these parameters can be used to generate more correlated states for the same number of originating particles.

We note that there is a correspondence between protocols for correcting errors during communication and protocols for distribution of entanglement. Therefore our protocols for error filtration during communication can be mapped in a straightforward way into protocols for filtering errors in distribution of entangled states (and vice versa).

The following description shows how to realise error filtration for quantum communication. The difference between error correction and error filtration is the following. In error correction the aim is actively to correct the errors that occur during transmission so that the decoded signal is as close as possible to the emitted signal. In error filtration that part of the signal which is affected by noise is discarded with high probability. What remains is a signal of reduced intensity but with less noise. This produces a signal of better quality than if no error filtration was carried out.

The error filtration protocols discussed in the following have a number of key advantages:

1. they are performed without controlled multi-particle interactions;
2. they do not require any special physical system for their implementation;
3. they do not require any special input quantum or classical state;
4. they can be applied to both bosons (e.g. photons) and fermions (e.g. electrons, or holes in semiconductors), and can be used for communication of single particle quantum states, multi-particle quantum states (e.g. coherent states, squeezed states, number states), entangled quantum states and also classical wave signals
5. they do not require active detection or active correction of errors.

For a better understanding of the present invention and to show how the same may be carried into effect, reference will now be made by way of example to the accompanying drawings.

1 DESCRIPTION OF THE PREFERRED EMBODIMENTS

Figure 1:
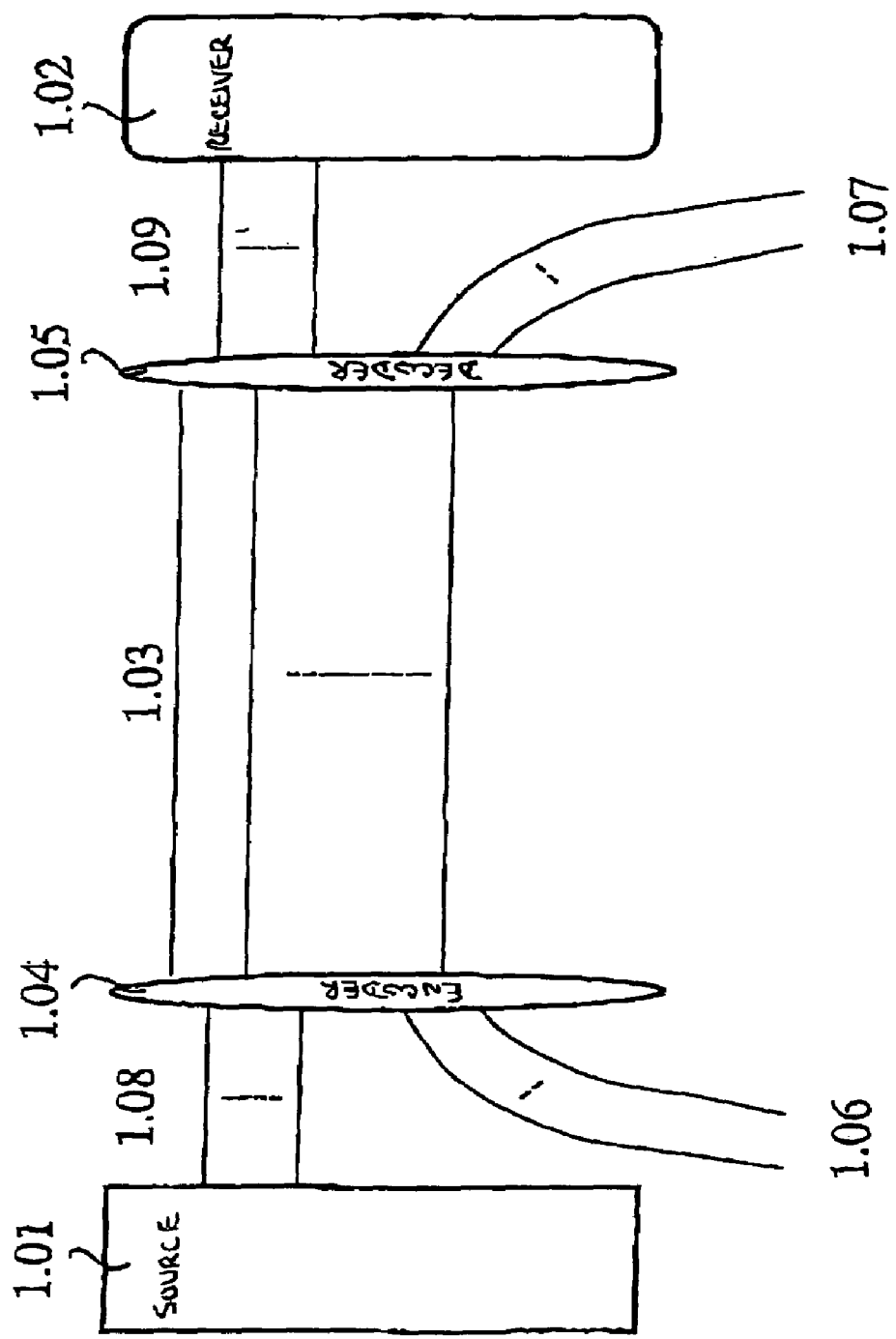
FIG. 1—General set-up for one-way communication.

Before discussing specific embodiments it is to be noted that the concept underlying the invention is to provide general methods of error filtration for quantum communication of wide applicability. The ideas described for quantum communication lead to protocols for error filtration for classical wave signals. We also describe how to implement the general algorithms in specific physical situations for quantum optics and mesoscopic quantum devices.

The following description has two parts.

General algorithms: We propose a family of general algorithms for implementing error filtration for communication of both quantum and classical information. These algorithms are technically feasible and applicable to a wide range of technologies which can be used for classical and quantum communication.

Specific applications: We describe how to implement the general algorithms in specific physical situations in quantum optics and mesoscopic quantum devices.

In general terms, the following embodiments are concerned with the correction of errors which occur during the communication of quantum and classical wave signals. The techniques apply in a variety of situations. These include when the aim is for a source to send single particle or multi-particle quantum signals or classical wave signals to a receiver. They also apply when one wishes to send a quantum signal from a source to multiple receivers and thus may be used for the distribution of quantum entanglement. The techniques have applications in the rapidly developing new areas of quantum communication, quantum computation and quantum cryptography, as well as in classical wave communication.

A range of general algorithms for error correction and examples of implementations of the general algorithms which are appropriate for a variety of physical realisations including (but not restricted to) quantum optics and mesoscopic quantum systems are described.

We describe specific protocols for error filtration for both quantum and classical wave signals: protocols for the case where the signal is affected by phase noise during transmission; protocols which apply when the signal has internal degrees of freedom; protocols which apply when the noise is non-linear; and protocols for reducing amplitude noise. We show how to implement error filtration in series (i.e. several times along the same transmission line) and that this increases the quality of the transmitted signal. We also show how to implement error filtration when transmitting entanglement to two or more parties. We give specific examples of the implementation of a number of the general protocols in quantum optics in free space and in fibres, using either spatially separated transmission channels, or in different time bins propagating along the same path. We also explain that there are analogous implementations to the optical one in other physical situations including mesoscopic quantum systems.

The following embodiments of the invention have a number of distinctive elements which are further explained below:

1. They rely on the idea which we call multiplexing. There are many manifestations of this idea including transmission channel multiplexing (where the number of transmission channels is greater than the number of source channels) and source multiplexing (where we send a signal through more source channels than the number of channels arriving at the receiver); the multiplexing may also be done in parallel and/or series.

2. The systems we consider means that we can arrange the physical implementations so that the noise in different transmission channels is essentially independent. It is the particular forms of the noise which allows our protocols to work.

3. We call our protocols error filtration since, unlike usual error correction for quantum signals, we do not try to correct errors which have occurred. Rather we identify cases in which errors have occurred and discard them thus obtaining a filtered signal.

Thus many of our implementations only use passive linear elements, since as we shall show, multiplexing can be implemented with only passive linear elements. In particular, and unlike most previous protocols, we do not measure the signal to identify the error and then perform active transformations on the system determined by the measurement results in order to correct the error. Some of our implementations use active elements—switches—however these elements realise "passive" linear transformations on the modes, i.e. they are not used to perform non-linear transformations or transformations conditional on the results of measurements on the signal.

In what follows we shall show how multiplexing can be used to implement error filtration for quantum and classical wave communication. However the basic idea of this invention, namely that multiplexing induces error filtration, can also be used in other aspects of quantum or classical wave information processing. For instance we noted above a simple change in vocabulary maps one-way communication protocols to protocols for protection of memories. Since our protocols only use one-way communication, they can be adapted to the protection of quantum memories or memories that use classical wave signals (for example, in the case of optical implementations of our ideas, the memories could be storage coils). As a further generalisation, we note that multiplexing could be used to filter out errors that occur in the logical elements of a quantum or classical wave computer. Indeed in all the communication protocols we consider, we suppose that the communication channel, in the absence of noise, does not modify the signal (i.e. it performs the identity transformation). However the error filtering properties of multiplexing are unaffected if the communication channel realises a non-trivial linear transformation U on the modes. This transformation U can be viewed as an element of a quantum or classical wave computer. In conclusion the use of multiplexing for error filtration of wide applicability and should be useful in many aspects of quantum and classical wave information processing.

FIG. 1 is a schematic diagram of a communications system utilising an embodiment of the present invention. A source generates at least one information carrying mode, in the form of quantum signals. The information carrying mode is supplied along a path 1.08 as a set of source states to an encoder 1.04. The encoder acts to encode the signals from the source 1.01 in a manner to be described later. The signals are then transmitted across a plurality of transmission channels denoted generally by reference numeral 1.03. Each of these channels is subject to independent noise. The signals from the plurality of transmission channels are received at a decoder 1.05 where they are linearly combined according to a procedure to be described later. The result of the linear combination regenerates the information carrying mode into one of a plurality of output channels designated generally as 1.09. These channels are denoted useful channels and the signals on these useful channels are picked up at a receiver 1.02. Another set of channels marked 1.07 are denoted as discard channels and the signals received on these channels are not utilised either in the received signal or from modifying the received signal. Reference numeral 1.06 denotes other input states which could in principle be supplied to the encoder but in fact according to the following described protocols are never activated. That is, the encoder 1.04 acts on the basis of a passive linear encoding not requiring controlled multi-particle interaction.

Figure 2:
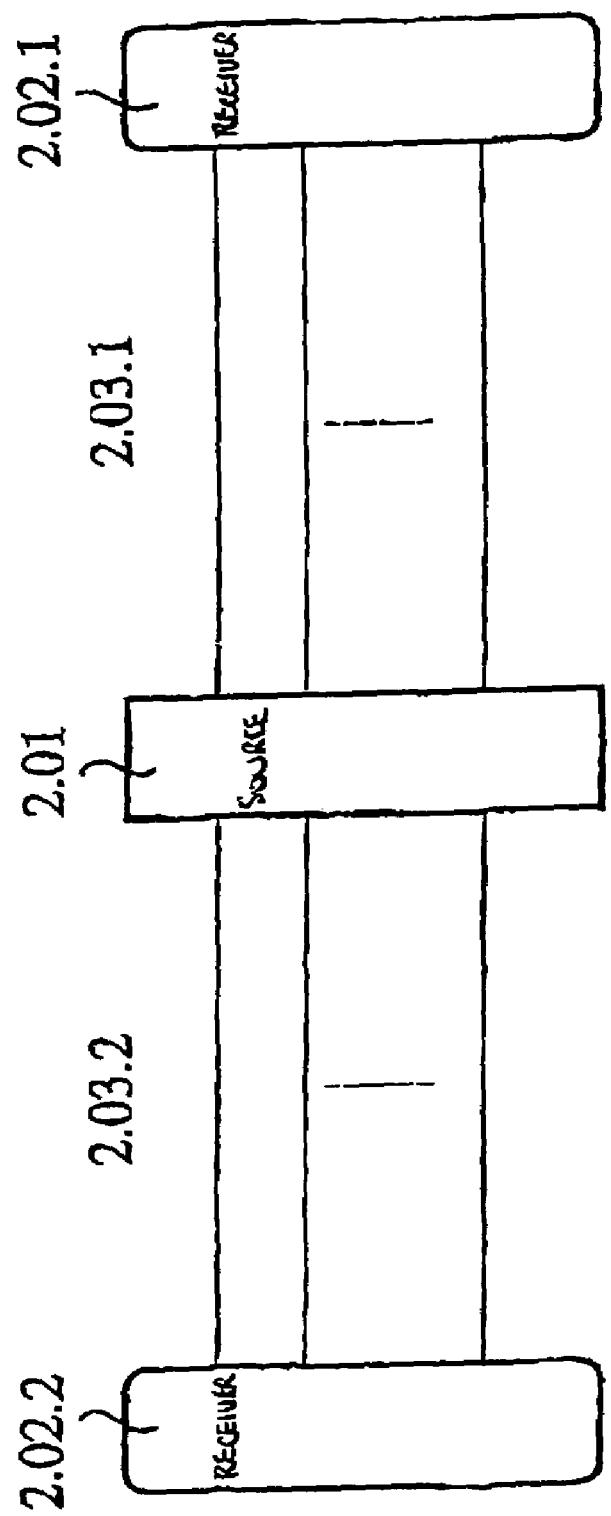
FIG. 2—General set-up for distribution of entangled states.

FIG. 2 illustrates a schematic diagram for the distribution of entangled quantum states. Reference numeral 2.01 denotes a source of entangled states. The entangled states are to be received by a first receiver 2.02.1 and a second receiver 2.02.2 respectively. A set of noisy transmission channels exist for the transmission of the entangled states in the source 2.01 to the respective receivers 2.02.1 and 2.02.2. Transmission channels are denoted respectively 2.03.1 and 2.03.2.

FIGS. 1 and 2 and the remaining FIGS. 3 to 13 are discussed in more detail in the sections which follow.

2 Protocols for Error Filtration 2.1 General Framework and Goals

We have three main classes of protocols. Protocols for one way communication of quantum signals (sections 2.6,2.7, 2.8,2.9, 2.10, 2.11), protocols for one way communication of classical wave signals (sections 2.12,2.13, 2.14,2.15) and protocols for distribution of entangled quantum states (section 2.16). We briefly review these three classes of protocols:

2.1.1 Protocols for One Way Communication of Quantum Signals

The general framework within which we work is illustrated in FIG. 1. There is a source 1.01 of quantum signals, and the aim is transmit these signals to the receiver 1.02. The signals must travel from the source to receiver through a noisy channel (1.03 in FIG. 1). Broadly speaking, in all cases the goals are to reduce the effect of the noise in the channel. We achieve these goals by specific encodings (using the encoder (1.04 in FIG. 1) of the signals from the source and decodings (using the decoder (1.05 in FIG. 1) of the signals after noisy transmission. In one family of protocols (section 2.10) the encoding/decoding procedure is repeated a number of times before signal reaches the final receiver.

2.1.2 Protocols for Communication of Classical Wave Signals

The general framework here is exactly the same as for the quantum communication protocols outlined above. Now however the signals are classical wave signals rather than quantum states.

2.1.3 Protocols for Distribution of Entangled Quantum States

The general framework here is illustrated in FIG. 2. There is a source 2.01 of entangled states of two bipartite systems. The first system is to be received by party A (2.02.1 in FIG. 2) and the second by party B (2.02.2 in FIG. 2). The signals must travel from the source to parties A and B through noisy channels (2.03.1 and 2.03.2 in FIG. 2). Depending on the circumstances, there might be a number of possible goals.

One might wish to produce states at the receivers which are as close as possible to some standard entangled state. A widely used case is that of a maximally entangled state. We call this entanglement distribution.

Alternatively the goal may be to produce states at the receiver which are as near as possible (in some suitable sense) to the states produced by the source.

The main difference between the two goals is that in the first case we are in effect allowed to choose the source and the original state that the source emits to produce the maximal amount of the required standard entangled state at the receivers. In the second case we cannot choose the state emitted by the source as we want but we have to use the state we are given.

Both the possibilities are illustrated below as examples of the general framework. As in the other cases, the goals are to reduce the effect of the noise in the channel; as before, these goals are achieved by specific encodings of the signals from the source and decodings of the signals after noisy transmission.

We should point out the although we will mostly discuss the communication of two-party states, the ideas we describe can be extended in a straightforward way to be used to communicate multi-party entangled states.

2.2 Description of the Noise

The general framework is as follows. The source emits signals in a total of $S_{tot}$ channels. These are encoded by the encoders into $T_{tot}$ channels. The signals then flow through the noisy channels and are decoded by the decoders to $R_{tot}$ receiver channels. Amongst the novel aspects of our inventions are the realisation that it is sufficient for error filtration to allow the encoding and decoding to change the dimension of the space of states: we say that the source channels are "multiplexed" to a larger number of transmission channels. This is key to the performance of the protocols.

Perhaps the most important aspect of our inventions is that the implementations we consider means that the dominant type of noise has a very specific form: the noise on each transmission channel is independent of that on any other transmission channel. It is the particular form of the noise which allows are protocols to work.

The simplest example we consider, and the one which we treat first (in section 2.6), is phase noise in a simple quantum channel. The space of transmission states is a $T_{tot}$ dimensional Hilbert space and the orthonormal transmission basis states $|j>_T (j=1 \ldots T_{tot})$ interact with the environment as $$|j>_T|0>_E \mapsto |j>_T(\alpha|0>_E + \beta|j>_E), |\alpha|^2+|\beta|^2=1 \quad (1)$$

where the environment states $|j>_E$ are orthogonal for different j. This represents the 20 physical situation in which the environment starts in the initial state $|0>_E$ and the interaction causes the state of the environment to be disturbed. $\alpha$ and $\beta$ describe the amount of disturbance; in general these parameters will depend on j. An alternative way of describing this noise is that the states $|j>_T$ acquire random phases:

$$|j>_T \mapsto e^{i\phi}|j>_T \text{ etc.} \quad (2)$$

where $\phi$ is a random phase with a distribution depending on the environment.

We note that in the specific implementations discussed in part 3, the dominant errors are phase noise errors. For this reason we put particular emphasis on phase noise.

However our protocols are by no means restricted to phase noise; more general forms of noise will be discussed below.

It is also important to emphasise here that the dominant noise in the quantum systems we consider is quite different from that usually considered. The most commonly considered implementations of quantum information processing use qubits (i.e. two level systems) as the basic building blocks. Multi-party systems in this case have a Hilbert space which is the tensor product of copies of the qubit Hilbert space. The noise in this situation is usually considered to be local on the qubits (see for example C H Bennett et al, Phys Rev Lett 76 (1996) 722, P W Shor, *Method for reducing decoherence in a quantum computer memory*, U.S. Pat. No. 5,768,297, A M Steane, Phys Rev Lett, 77 (1996) 793). The interactions with the environment can cause bit-flip and phase errors on the individual qubits. The theory of quantum error correction codes has been developed to offer a method of protecting these systems against these errors. We note that the number of elementary errors in this case grows linearly with the number of qubits or in other words, it grows as the logarithm of the dimension of the Hilbert space. By contrast, in the case of all of the simpler quantum protocols that we consider (except the multi-excitation protocol of section 2.11), the space of transmission states is the direct sum of systems; it is not, in any physically natural way, the tensor product of systems of smaller dimension. Thus the errors we consider here are quite different from those considered in the multi-qubit framework, and the techniques developed for those systems are not relevant here. In particular the number of elementary errors that occur in our system grows linearly with the dimension of the Hilbert space.

2.3 Overview of the Protocols

We present below a number of different protocols for both quantum and classical communication. We start by considering the simplest protocol and generalise the ideas in a number of ways; we also show how to apply to a variety of different physical situations. While we describe the generalisations one by one, it will be clear that often they may be used together to enhance error filtration. For example the general protocol in section 2.8 can be combined with the series protocol 2.10 etc.

1. Simple quantum protocol for filtration of phase noise (section 2.6). This protocol applies to single particle quantum states in which each channel is described by a one-dimensional Hilbert space. The noise we consider in this case is phase noise. We give a specific encoding/decoding scheme which reduces the effect of errors in the transmission channels.

2. General quantum protocol for filtration of phase noise (section 2.7). We next show how to generalise the protocol in section 2.6 to a much larger class of encoding/decoding schemes than the one based on the Fourier transform in the previous section.

3. General quantum protocol for filtration of phase noise with collective encoding (section 2.8). A further generalisation is to allow each transmission channel to carry signal from more than one source channel; this is described here.

4. Quantum protocol for filtration of more general noise (section 2.9). We now extend the previous protocols to the case where each channel carries internal degrees of freedom. The noise has the effect of performing a random rotation of the internal degrees of freedom. We again present a specific encoding/decoding scheme here.

5. Quantum series protocol (section 2.10). In the previous protocols there is a single encoding step and a single decoding step. Here we present a protocol which uses repeated encoding/decoding steps and has enhanced error reduction capabilities over protocols with only a single encoding/decoding step. While we only describe multiple use of the encoding/decoding idea for the example of single party quantum states in which each channel is described by a one-dimensional Hilbert space, any of the protocols we describe can be enhanced by repeating the encoding/decoding modules.

6. Quantum multi-excitation protocol (section 2.11). In this section we show that the idea of multiplexing transmission channels is also applicable to systems in which there are many quanta of excitation in each channel.
7. Protocols for error filtration for classical wave propagation (section 2.12). Next we turn to applications to classical wave propagation of the ideas we have developed in the previous quantum protocols. Firstly we consider classical waves whose modes are described by a single complex amplitude. The noise we consider first is that each transmission mode amplitude gets modified by a random phase. We consider a specific protocol, the exact analogue of the quantum protocol in section 2.6.
8. Classical channels with internal degrees of freedom (section 2.13). We then extend the protocol to classical signals with internal degrees of freedom in which case the noise is causes each mode to be modified by the action of a random rotation.
9. Non-linear classical noise (section 2.14). In the previous classical protocols (sections 2.12 and 2.13) we have assumed that the noise is linear. In other words we assume that the strength of the noise is independent of the intensity of the wave in any channel. We point out in this section that our protocols are still applicable even if this assumption is relaxed: the protocols are effective even if the noise is non-linear in the intensity of the signal.
10. Classical and quantum amplitude noise (section 2.15). All the previous protocols have been described for cases where the noise which is unitary. For example in the case that the amplitude of the classical signal was a complex number (as in sections 2.12 and 2.14), the noise had the effect of multiplying the amplitude in each channel by a random number of modulus one. In this section we show that it was not essential that the noise preserve the intensity of each mode, even if the noise also reduces the amplitude of the signal, our protocols are effective. This is true both in the classical and quantum case.
11. Protocols for communication of entangled states (section 2.16). Finally we return to considering quantum signals, but now the aim is to propagate an entangled state from the source to two receivers, A and B. We show how to build protocols to protect this propagation against noise.

2.4 Framework for One-Way Communication Protocols

The general framework within which we work is illustrated in FIG. 1. There is a source 1.01 of quantum signals, and the aim is transmit these signals to the receiver 1.02. The signals must travel from the source to receiver through a noisy channel (1.03 in FIG. 1). The signal is encoded using the encoder (1.04 in FIG. 1) and decoded using the decoder (1.05 in FIG. 1). The states emitted by the source, the "source states" are labelled 1.08. Unitarity means that the total number of states entering the encoder, must be equal to the total number of states leaving the encoder. Thus since we have in mind that the number of transmission states 1.03 will be larger than the number of source states 1.08 it must be the case that the encoder has, in principle, a number of other input states 1.06. However these states will not be activated in our protocols; that is we never send signals through the states 1.06. Indeed these channels need not exist physically; for example in an implementation using optical fibres, the number of fibres entering the encoder could be less than that leaving the decoder. Similarly, unitarity means that the total number of states entering the decoder, must, in principle, be equal to the total number of states leaving the decoder. We will arrange our protocols so that only some of the output states from the decoder are "useful"; these are labelled 1.09. The remaining output states, labelled 1.07 will be discarded; as with the encoder, these fibres need not exist as physical objects. The protocols are such that there may be a signal in these discarded outputs 1.07. However this arises only when noise has occurred during transmission. We describe our protocols as "error filtering" since they are designed so that part of the noise, which would otherwise go to the receiver, goes into these discarded channels.

2.5 Basic Principle of the One-way Communication Protocols

The basic principle which explains how our one-way communication protocol works is as follows:

The signal is emitted by the source in a number of useful source channels 1.08. The encoder 1.04 encodes these states in a superposition of a larger number of transmission states 1.03. At the decoder 1.05 the transmission states are interfered. The decoder is such that when no noise occurs during the transmission, the transmission states interfere constructively and end up in a number of useful receiver states 1.09 which are fewer in number than the total number of output states from the decoder, and which are in one-to-one correspondence with the useful source states. On the other hand, when noise occurs, the states in the different transmission channels can no longer interfere, because each of them is correlated with a different state of the environment which preserves, in principle, the information about the channel in which the noise occurred. Then the unitarity of quantum evolutions implies that when the noise occurs the states end up spread into other output channels in addition to the useful ones.

Consequently, while the entire unperturbed state ends up in the useful receiver channels, only part of the noise ends up in the useful receiver channels, while the rest of the noise ends up in the other receiver channels 1.07 and it is discarded.

2.6 Simple Quantum Protocol for Filtration of Phase-noise

In this section we consider a simple example of the general framework given in FIG. 1. The signals we consider are quantum states of a single particle. Each channel contains one state (i.e. there are no internal degrees of freedom). The noise is phase noise (described in section 2.2, see also below). Also the encoding and decoding process is particularly simple in that each source channel is separately encoded and decoded.

Figure 3:
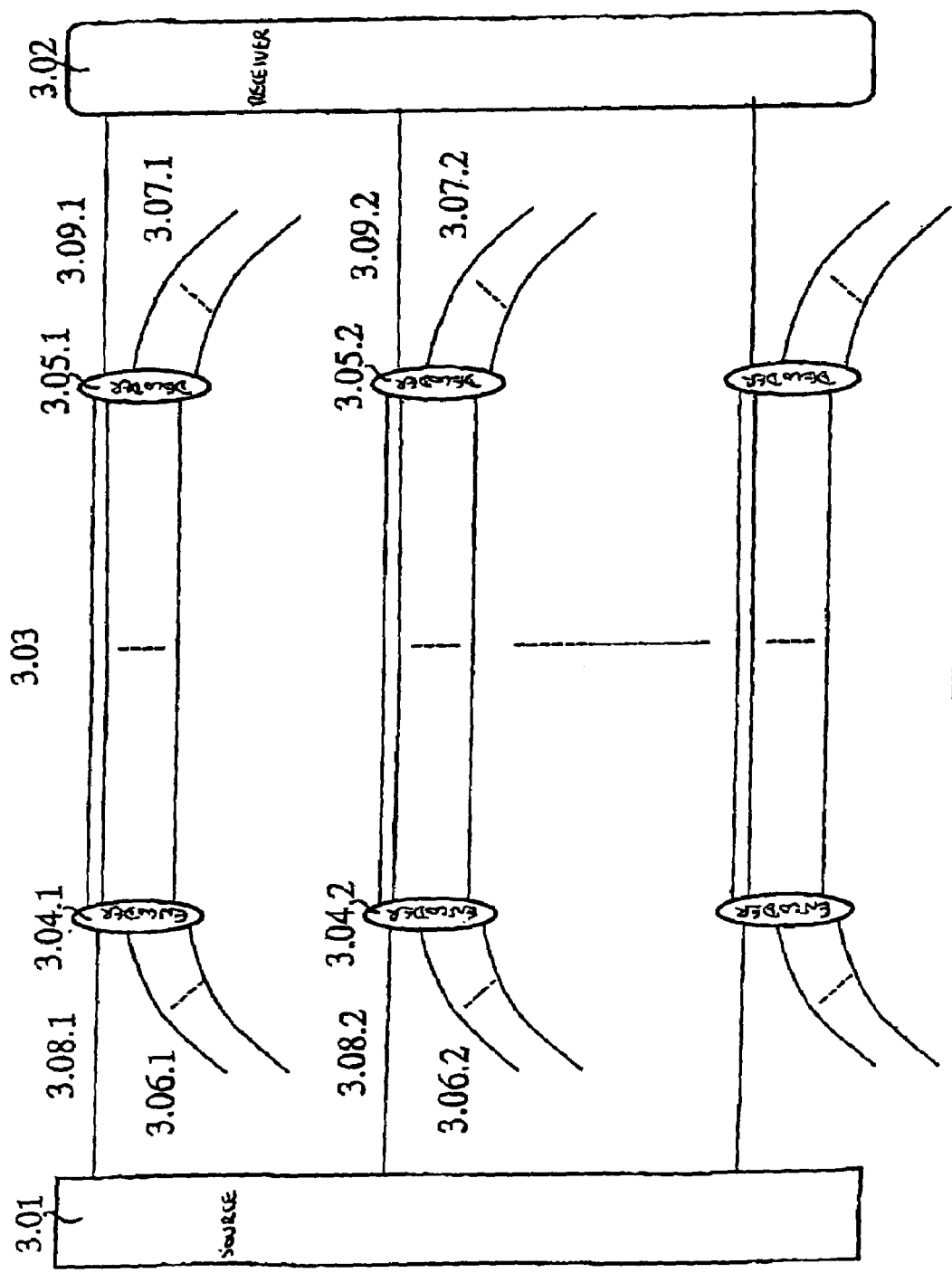
FIG. 3—Simple protocol for one-way communication.
Figure 4:
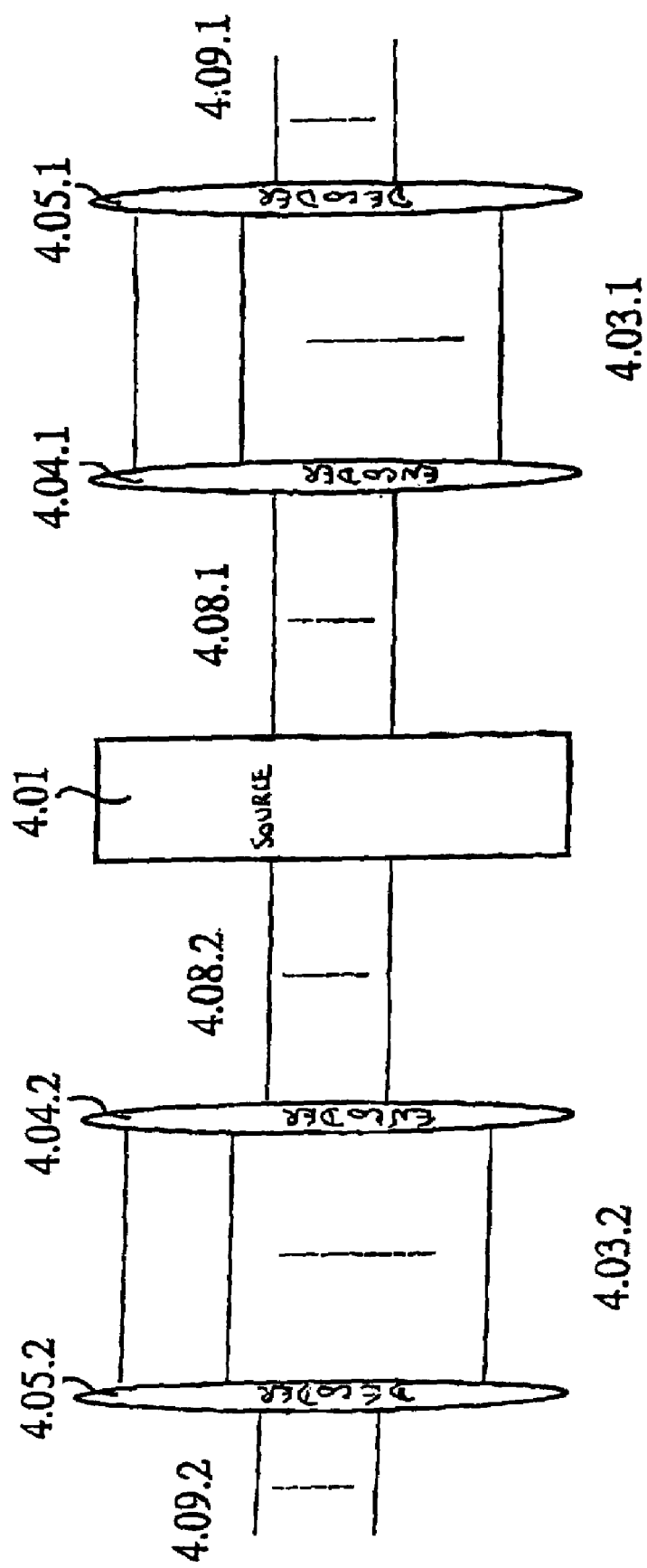
FIG. 4—General protocol for distribution of entangled states.

The protocol is illustrated in FIG. 3. There is a source 3.01 of quantum signals. These signals are the quantum states of a single particle. The signal can therefore be written as $$|\psi\rangle = \sum_{l=1}^{S_{tot}} c_l |l\rangle_S$$

where $c_l$ is the amplitude that the particle is in source channel l and $|l\rangle_S$ denotes the state of the particle if it is in source channel l (denoted 3.08.1, 3.08.2 etc. in FIG. 3). $S_{tot}$ is the total number of source channels. The aim is transmit this signal to the receiver 3.02. The signals travel from the source to receiver through a noisy channel (3.03 in FIG. 3). Each source channel 3.08.1, 3.08.2 etc. is encoded using a separate encoder (3.04.1, 3.04.2 etc. in FIG. 3) and decoded using a separate decoder (3.05.1, 3.05.2 etc. in FIG. 3). 3.06.1, 3.06.2 etc. are the unused input states for each encoder. The "useful" states going to the receiver are labelled 3.09.1, 3.09.2 etc.; the remaining output states, labelled 3.07.1, 3.07.2 etc. will be discarded.

The noise we consider in this case is phase noise; that is any transmission state $|j\rangle_T$ interacts with the environment as $$|j\rangle_T|0\rangle_E \mapsto |j\rangle_T(\alpha|0\rangle_E + \beta|j\rangle_E), \quad |\alpha|^2 + |\beta|^2 = 1 \quad (3)$$

where the environment states $|j\rangle_E$ are orthogonal for different j.

Since, as mentioned above, in this protocol we encode and decode each source channel separately, we can focus on a particular one, $|1\rangle_S$, say.

Consider first what happens if we transmit without error filtration. In other words we start with the system in the source state $|1\rangle_S$ and encode it as a transmission state $|1\rangle_T$ (i.e. the encoding is essentially trivial). The system plus environment transforms as $$|1\rangle_S|0\rangle_E \mapsto |1\rangle_T|0\rangle_E \mapsto |1\rangle_T(\alpha|0\rangle_E + \beta|1\rangle_E). \quad (4)$$

We now perform the trivial decoding $$|1\rangle_T \mapsto |1\rangle_R, \quad (5)$$

so that the final state at the receiver is $$|1\rangle_R(\alpha|0\rangle_E + \beta|1\rangle_E). \quad (6)$$

Thus the amplitude for an error to have occurred is $\beta$.

So let us now consider how multiplexing can allow us to filter the state to have a smaller error amplitude. We again start with the state of the source $|1\rangle_S$ but now encode into T transmission channels:

$$|1\rangle_S \mapsto \frac{1}{\sqrt{T}} \sum_{j=1}^{T} |j\rangle_T. \quad (7)$$

This state can be thought of as the effect of a Fourier transform on this input state. Thus the state of the system plus environment becomes $$\frac{1}{\sqrt{T}} \sum_{j=1}^{T} |j\rangle_T |0\rangle_E. \quad (8)$$

The noise now occurs, causing the state to change to $$\frac{1}{\sqrt{T}} \sum_{j=1}^{T} |j\rangle_T (\alpha|0\rangle_E + \beta|j\rangle_E). \quad (9)$$

We now decode by performing the inverse Fourier transform:

$$|j\rangle_T \mapsto \frac{1}{\sqrt{T}} \sum_{k=1}^{T} e^{2i\pi j(k-1)/T} |k\rangle_R. \quad (10)$$

Thus the state becomes $$\frac{1}{T} \sum_{j=1}^{T} \sum_{k=1}^{T} e^{2i\pi j(k-1)/T} |k\rangle_R (\alpha|0\rangle_E + \beta|j\rangle_E) = |1\rangle_R \left( \alpha|0\rangle_E + \frac{\beta}{\sqrt{T}} |\tilde{1}\rangle_E \right) + \frac{\beta}{T} \sum_{j=1}^{T} \sum_{k=2}^{T} e^{2i\pi j(k-1)/T} |k\rangle_R |j\rangle_E, \quad (11)$$

where $$|\tilde{1}\rangle_E = \frac{1}{\sqrt{T}} \sum_{j=1}^{T} |j\rangle_E \quad (12)$$

is a normalised state of the environment, and where we used the fact that for every k=2, . . . T $$\sum_{j=1}^{T} e^{2i\pi j(k-1)/T} = 0. \quad (13)$$

We see that this state has a component in the receiver channel $|1\rangle_R$, which we regard as the "useful" signal and components in all the other receiver channels, $|k\rangle_R$, k=2, . . . T which we will discard.

The state which appears in the $|1\rangle_R$ receiver channel is $$|1\rangle_R \left( \alpha|0\rangle_E + \frac{\beta}{\sqrt{T}} |\tilde{1}\rangle_E \right). \quad (14)$$

We thus see that the effect of the encoding/decoding is to reduce the noise amplitude in the useful channel by a factor of $\sqrt{T}$ (i.e. from $\beta$ to $\beta/\sqrt{T}$). Thus we have achieved the aim of error filtration.

We note that the probability that the state appears in the useful channel is the magnitude squared of the state in (14), i.e.

$$|\alpha|^2 + \frac{|\beta|^2}{T}. \quad (15)$$

On the other hand, there is a probability of $$1 - \left( |\alpha|^2 + \frac{|\beta|^2}{T} \right)$$

that the state appears at one of the "non-useful" receivers channels, $|k\rangle_R$, k=2, . . . T. These channels are non-useful because the state ending here is always correlated with noise in the environment. Indeed, we see in (11) that the component containing the receiver channels $|k\rangle_R$, k=2, . . . T is $$\frac{\beta}{T} \sum_{j=1}^{T} \sum_{k=2}^{T} e^{2i\pi j(k-1)/T} |k\rangle_R |j\rangle_E, \quad (16)$$

and has no overlap with the unperturbed state of the environment $|0\rangle_E$.

We also point out that the protocol has the property that if there is no noise, the encoding/decoding steps are arranged so that there is constructive interference, and all the source signal arrives in the useful receiver channel.

We note that the state $|1\rangle_S$ alone does not carry a true quantum signal; quantum signals are carried by superpositions of states. Thus one needs a state in a Hilbert space of at least dimension two to carry a quantum signal.

As an example the effect of the filtration can be seen by considering the interference between two (orthogonal) input source states $|1\rangle_S$ and $|T+1\rangle_S$, say (i.e. $S_{tot}=2$). With this two dimensional Hilbert space of source states we are now able to propagate a true quantum signal. We will have $T_{tot}=2T$ transmission states. Let us consider the input superposition $$\frac{1}{\sqrt{2}}(|1\rangle_S + e^{i\Phi}|T+1\rangle_S), \tag{17}$$

and see how the visibility of the interference pattern is affected by the noise. The interference may be seen by projecting the state at the receiver along the direction $$\frac{1}{\sqrt{2}}(|1\rangle_R + |T+1\rangle_R). \tag{18}$$

If there is no noise and the encoding and decoding are trivial, i.e.

$$|1\rangle_S \mapsto |1\rangle_T \mapsto |1\rangle_R \text{ and } |T+1\rangle_S \mapsto |T+1\rangle_T$$
$$\mapsto |T+1\rangle_R, \tag{19}$$

then the amplitude of the projection along (18) is $$\frac{1}{2}(1 + e^{i\Phi}), \tag{20}$$

thus the intensity is $$\left|\frac{1}{2}(1 + e^{i\Phi})\right|^2 = \frac{1}{2}(1 + \cos\Phi). \tag{21}$$

Thus the visibility is 1.

Consider what happens if there is noise in the transmission channels and no error filtration (i.e. the encoding/decoding is trivial):

$$|1\rangle_T|0\rangle_E \mapsto |1\rangle_T(\alpha|0\rangle_E\beta|1\rangle_E);$$

$$|T+1\rangle_T|0\rangle_E \mapsto |T+1\rangle_T(\alpha|0\rangle_E + \beta|T+1\rangle_E). \tag{22}$$

The intensity of the projection along (18) at the receiver is $$\frac{1}{2}(1 + |\alpha^2|\cos\Phi); \tag{23}$$

i.e. the visibility has been reduced to $|\alpha^2|$.

If on the other hand each input channel is separately multiplexed to T transmission channels (i.e. there is a total of $T_{tot}=2T$ transmission channels) one finds that the intensity of the projection along (18) at the receiver is $$\frac{1}{2}(|\alpha^2| + |\beta|^2/T)\left(1 + \left(\frac{T|\alpha|^2}{T|\alpha|^2 + |\beta|^2}\right)\cos\Phi\right) \tag{24}$$

Thus the visibility of interference increases monotonically with the number of transmission channels and tends to 1 as the amount of multiplexing T tends to infinity.

It is also important to emphasise here that while we have treated the case that the noise in each transmission channel had the same distribution, this was not essential. Rather than the noise model $$|j\rangle_T|0\rangle_E \mapsto |j\rangle_T(\alpha|0\rangle_E+\beta|j\rangle_E) \tag{25}$$

it could have been the case that the noise parameters $\alpha$ and $\alpha$ depended on the channel j. i.e.

$$|j\rangle_T|0\rangle_E \mapsto |j\rangle_T(\alpha_j|0\rangle_E+\beta_j|j\rangle_E) \tag{26}$$

While the detailed calculations will change in this case, as long as the noise in different channels is independent, the protocol will still have the effect of reducing the noise appearing in the receiver channel. While all the protocols we discuss below also consider identically distributed noise, the same remark applies: exactly how much the noise is reduced depends on the details of the distribution of noise, however the idea of muliplexing along the lines above will still be effective in error filtration whether the distribution is the same for all channels or not.

2.7 General Quantum Protocol for Filtration of Phase-noise

We now present a more general class of protocols for correcting phase noise; these generalise the protocol in section 2.6. The generalization consists in allowing more general encoding and decoding operations than the Fourier transform used in section 2.6. This more general is also illustrated by FIG. 3.

Since here, as in section 2.6, we encode and decode each source channel separately, we can focus on a particular one, $|1\rangle_S$, say.

We start with the state of the source $|1\rangle_S$ but now encode the source state into T transmission channels:

$$|1\rangle_S \mapsto U_e|1\rangle_S, \tag{27}$$

where the encoding transformation $U_e$ is a unitary map from the source Hilbert space (which includes both the source state $|1\rangle_S$ denoted 3.08.1 in FIG. 3 and the other input states 3.06.1) to the transmission Hilbert space (denoted 3.03 in FIG. 3). i.e. $U_e'U_e=(\text{id})_S$ and $U_eU_e'=(\text{id})_T$, where id is the identity operator in the given Hilbert space. We can write the above state in terms of an orthonormal basis of transmission states $|j\rangle_T$, $$U_e|1\rangle_S = \sum_{j=1}^{T} {}_T\langle j|U_e|1\rangle_S \ |j\rangle_T. \tag{28}$$

This unitary transformation is a generalisation of the Fourier transform (7).

Following encoding, the state of the system plus environment becomes $$\sum_{j=1}^{T} {}_T\langle j|U_e|1\rangle_S \ |j\rangle_T|0\rangle_E. \tag{29}$$

The noise (3) now occurs, causing the state to change to $$\sum_{j=1}^{T} {}_T\langle j|U_e|1\rangle_S \ |j\rangle_T(\alpha|0\rangle_E + \beta|j\rangle_E) \tag{30}$$

We now decode by performing a second decoding unitary transformation (the generalisation of the inverse Fourier transform (10)):

$$|j\rangle_T \mapsto U_d|j\rangle_T. \tag{31}$$

Unitarity means that $U_d^\dagger U_d = (\text{id})_T$ and $U_d U_d^\dagger = (\text{id})_R$. Thus the state becomes $$\sum_{j=1}^{T} {}_T\langle j|U_e|1\rangle_S \ U_d|j\rangle_T(\alpha|0\rangle_E + \beta|j\rangle_E). \tag{32}$$

Up to this point the encoding and decoding procedure is very general. We will now restrict ourselves by demanding that if there is no noise, the state should be transmitted exactly into the receiver channel $|1\rangle_R$. Thus we specify $$U_d U_e |1\rangle_S = |1\rangle_R. \tag{33}$$

Thus the state of the system and environment becomes $$|1\rangle_R \left( \alpha|0\rangle_E + \beta \sum_{j=1}^{T} {}_T\langle j|U_e|1\rangle_{SR}\langle 1|U_d|j\rangle_T|j\rangle_E \right) + \beta \sum_{j=1}^{T}\sum_{k=2}^{R} c_{kj}|k\rangle_R|j\rangle_E, \tag{34}$$

where $$c_{kj} = {}_T\langle j|U_e|1\rangle_S {}_R\langle k|U_d|j\rangle_T \tag{35}$$

Again, we see that this state has a component in the receiver channel $|1\rangle_R$, which we regard as the "useful" signal and components in all the other receiver channels which we will discard.

The state in the useful receiver channel is $$|1\rangle_R \left( \alpha|0\rangle_E + \beta \sum_{j=1}^{T} {}_T\langle j|U_e|1\rangle_S \ {}_R\langle 1|U_d|j\rangle_T|j\rangle_E \right). \tag{36}$$

The probability that the particle ends in the useful channel is the magnitude squared of the state (36), i.e.

$$|\alpha|^2 + |\beta|^2 \sum_{j=1}^{T} |{}_T\langle j|U_e|1\rangle_S \ {}_R\langle 1|U_d|j\rangle_T|^2 \tag{37}$$

On the other hand, there is a probability of $$1 - \left( |\alpha|^2 + |\beta|^2 \sum_{j=1}^{T} |{}_T\langle j|U_e|1\rangle_S \ {}_R\langle 1|U_d|j\rangle_T|^2 \right) \tag{38}$$

that the particle appears at one of the "non-useful" receivers channels, $|k\rangle_R$, $k=2 \ldots T$. These channels are non-useful because the particle ending here is always correlated with noise in the environment. Indeed, we see in (34) that the component containing the receiver channels $|k\rangle_R$, $k=2,\ldots,T$ is $$\beta \sum_{j=1}^{T}\sum_{k=2}^{T} c_{kj}|k\rangle_R|j\rangle_E, \tag{39}$$

which has no overlap with the unperturbed state of the environment $|0\rangle_E$.

The probability of noise in the useful receiver channel is $$|\beta|^2 \sum_{j=1}^{T} |{}_T\langle j|U_e|1\rangle_S \ {}_R\langle 1|U_d|j\rangle_T|^2. \tag{40}$$

Now Schwartz's inequality shows that this magnitude is greater than $$\frac{|\beta|^2}{T} \left| \sum_{j=1}^{T} {}_T\langle j|U_e|1\rangle_S \ {}_R\langle 1|U_d|j\rangle_T \right|^2 = \frac{|\beta|^2}{T}, \tag{41}$$

with equality when $$|{}_T\langle j|U_e|1\rangle_S \ {}_R\langle 1|U_d|j\rangle_T| = \frac{1}{T}, \quad \text{independent of } j. \tag{42}$$

Thus for any encoding and decoding scheme satisfying the conditions (33) and (42), we find that the noise amplitude is reduced by a factor of $$\frac{1}{\sqrt{T}}.$$

One example of encoding/decoding schemes satisfying these conditions is the Fourier transform in the previous section. A second example is the Hadamard transform; in the case of four transmission channels encoding each source channel, the encoding is $$|1\rangle_S \mapsto \frac{1}{2}(|1\rangle_T + |2\rangle_T + |3\rangle_T + |4\rangle_T) \tag{43}$$

$$|2\rangle_S \mapsto \frac{1}{2}(|1\rangle_T + |2\rangle_T - |3\rangle_T - |4\rangle_T)$$

$$|3\rangle_S \mapsto \frac{1}{2}(|1\rangle_T - |2\rangle_T + |3\rangle_T - |4\rangle_T)$$

-continued $$|4\rangle_S \mapsto \frac{1}{2}(|1\rangle_T - |2\rangle_T - |3\rangle_T + |4\rangle_T);$$

the decoding step is $$|1\rangle_T \mapsto \frac{1}{2}(|1\rangle_R + |2\rangle_R + |3\rangle_R + |4\rangle_R) \quad (44)$$

$$|2\rangle_T \mapsto \frac{1}{2}(|1\rangle_R + |2\rangle_R - |3\rangle_R - |4\rangle_R)$$

$$|3\rangle_T \mapsto \frac{1}{2}(|1\rangle_R - |2\rangle_R + |3\rangle_R - |4\rangle_R)$$

$$|4\rangle_T \mapsto \frac{1}{2}(|1\rangle_R - |2\rangle_R - |3\rangle_R + |4\rangle_R).$$

2.8 General Quantum Protocol for Filtration of Phase Noise with Collective Encoding In earlier sections, a given source channel is encoded into a sub-set of the transmission channels, but the signal carried in a given transmission channel came from a single source channel. It is possible to generalise these ideas by allowing each transmission channel to carry signals from more than source channel. This will be of use, for example, when the number of source channels does not divide the number of transmission channels (eg 2 source channels and 3 transmission channels).

Thus the general situation is that we have $S_{tot}$ source channels which we encode collectively into $T_{tot}$ transmission channels and then decode the transmission channels collectively into $R_{tot}$ receiver channels; we are particularly interested in the case that $S_{tot}=R_{tot}$. It is clear that the previous protocols, in which a given source channel is encoded into T transmission channels, and each source channel is encoded into a different set of transmission channels, is included in this general framework. But other possibilities are possible.

Here we will simply illustrate the idea with an example. We consider again the case of phase noise: errors in the transmission channels of the form $$|k\rangle_T \mapsto |k\rangle_T(\alpha|0\rangle_E + \beta|k\rangle_E) \quad k=1 \ldots T_{tot} \quad (45).$$

If each source channel $|j\rangle_S$ $j=1 \ldots S_{tot}$ is simply sent along a single transmission channel (trivial encoding) the error amplitude is $\beta$. However an example of the general framework in the previous paragraph is the following encoding/decoding scheme, based on the Fourier transform. The encoding step is $$|j\rangle_S \mapsto \frac{1}{\sqrt{T}} \sum_{k=1}^{T_{tot}} e^{-2\pi i k(j-1)/T} |k\rangle_T. \quad (46)$$

The decoding step is $$|k\rangle_T \mapsto \frac{1}{\sqrt{T}} \sum_{m=1}^{S_{tot}} e^{-2\pi i k(m-1)/T} |m\rangle_R. \quad (47)$$

For example this protocol may be used in the case that $S_{tot}=2=R_{tot}$ and $T_{tot}=3$. Let us write the state emitted by the source as $$\alpha_1|1\rangle_S + \alpha_2|2\rangle_S. \quad (48)$$

It may be calculated that the fidelity of the state arriving at the receiver in the channels $|1\rangle_R$ and $|2\rangle_R$ to the incoming state is $$\frac{|\alpha|^2 + \frac{|\beta|^2}{3}(1 + 2|\alpha_1|^2|\alpha_2|^2)}{|\alpha|^2 + \frac{2|\beta|^2}{3}}. \quad (49)$$

The average value of this fidelity over the Bloch sphere of incoming states is $$\frac{|\alpha|^2 + \frac{4|\beta|^2}{9}}{|\alpha|^2 + \frac{2|\beta|^2}{3}}. \quad (50)$$

For any $\alpha$ and $\beta$, this is greater than the average fidelity achieved by simply sending each source state through one transmission channel.

2.9 Quantum Protocol for Filtration of More General Noise

The fact that the noise corrected by the previous protocols was phase-noise, and hence corresponds to random elements of the Abelian group U(1) was not critical. The protocols can be simply extended to the case where each channel can carry a system which has "internal" degrees of freedom (i.e. each channel has a state space which is a Hilbert space of arbitrary dimension I; we shall consider this dimension to be finite here, but this is not essential to the success of the protocol).

Thus we consider an orthonormal set of source states $$|i\mu s\rangle_S; \ i=1 \ldots S_{tot}, \mu=1 \ldots I. \quad (51)$$

An example is the case where each channel can carry a spin degree of freedom, so that I=2. We consider a set of transmission states $$|j\mu\rangle_T; \ j=1 \ldots T_{tot}, \mu=1 \ldots I. \quad (52)$$

i.e. there are $T_{tot}$ transmission channels each of which carries a state space of dimension I. The transmission states are affected by the following noise:

$$|j\mu\rangle_T|0\rangle_E \mapsto \alpha|j\mu\rangle_T|0\rangle_E + \sum_{\nu=1}^{I}\sum_{\lambda=1}^{L} \beta_\lambda(E_\lambda)_{\mu\nu}|j\nu\rangle_T|j\lambda\rangle_E. \quad (53)$$

This describes L types of error; each error corresponds to a rotation of the system state. In the case of internal spin degrees of freedom, I=2, an example of a set of possible errors is the set of three Pauli matrices:

$$(E_1)_{\mu\nu}=(\sigma_x)_{\mu\nu}; \ (E_2)_{\mu\nu}=(\sigma_y)_{\mu\nu}; \ (E_3)_{\mu\nu}=(\sigma_z)_{\mu\nu}. \quad (54)$$

Thus $|j\lambda\rangle_E$ is the state of the environment if error $\lambda$ occured on channel j.

The total probability of error in the channel (53) is $$\left|\sum_{v=1}^{I}\sum_{\lambda=1}^{L}\beta_{\lambda}(E_{\lambda})_{\mu v}|jv\rangle_{T}|\lambda\rangle_{E}\right|^{2} = \sum_{\lambda=1}^{L}|\beta_{\lambda}|^{2}\left|\sum_{v=1}^{I}(E_{\lambda})_{\mu v}\right|^{2} \quad (55)$$
$$= 1 - |\alpha|^{2}$$

Thus if the source state $|1\mu\rangle_S$ is simply sent through a single transmission channel with trivial encoding and decoding, $$|1\mu\rangle_S \mapsto |1\mu\rangle_T \mapsto |1\mu\rangle_R, \quad (56)$$

the probability of error is $$1-|\alpha|^2. \quad (57)$$

Now consider a simple error-filtration protocol in which the source channel is multiplexed to T transmission channels. The encoding step is $$|1\mu\rangle_S|0\rangle_E \mapsto \frac{1}{\sqrt{T}}\sum_{j=1}^{T}|j\mu\rangle_T|0\rangle_E. \quad (58)$$

Note that the encoding is independent of $\mu$.

Now the noise occurs during the transmission, and the state becomes $$\frac{1}{\sqrt{T}}\sum_{j=1}^{T}|j\mu\rangle_T|0\rangle_E \mapsto \quad (59)$$

$$\frac{1}{\sqrt{T}}\sum_{j=1}^{T}\alpha|j\mu\rangle_T|0\rangle_E + \frac{1}{\sqrt{T}}\sum_{j=1}^{T}\sum_{v=1}^{I}\sum_{\lambda=1}^{L}\beta_{\lambda}(E_{\lambda})_{\mu v}|jv\rangle_T|j\lambda\rangle_E.$$

The decoding step for this protocol is also the Fourier transform on the j indices:

$$|jv\rangle_T \mapsto \frac{1}{\sqrt{T}}\sum_{k=1}^{T}e^{2i\pi j(k-1)/T}|kv\rangle_R. \quad (60)$$

As before we select the term $|1\mu\rangle_R$ at the receiver; thus the state in this receiver channel is $$\alpha|1\mu\rangle_R|0\rangle_E + \frac{1}{\sqrt{T}}\sum_{j=1}^{T}\sum_{v=1}^{I}\sum_{\lambda=1}^{L}\beta_{\lambda}(E_{\lambda})_{\mu v}|1v\rangle_T|j\lambda\rangle_E. \quad (61)$$

Now the probability that the state was affected by noise is the square of the magnitude of the second term:

$$\frac{1}{T^2}\left|\sum_{j=1}^{T}\sum_{v=1}^{I}\sum_{\lambda=1}^{L}\beta_{\lambda}(E_{\lambda})_{\mu v}|1v\rangle_R|j\lambda\rangle_E\right|^{2} = \frac{1}{T}\sum_{\lambda=1}^{L}|\beta_{\lambda}|^{2}\left|\sum_{v=1}^{I}(E_{\lambda})_{\mu v}\right|^{2} \quad (62)$$

where we have used the fact that $$_E\langle j_1\lambda_1|j_2\lambda_2\rangle_E = \delta_{j_1 j_2}\delta_{\lambda_1\lambda_2} \text{ and } _R\langle 1v_1|1v_2\rangle_R = \delta_{v_1 v_2} \quad (63)$$

Thus comparing (62) with (55) we see that the error filtration protocol has reduced the probability of error by a factor of $1/T$, i.e. each error amplitude has been reduced by a factor of $1/\sqrt{T}$.

This protocol has essentially used the Fourier transform to encode and decode. It is not difficult to extend the protocol to more general encoding/decodings as was done for phase noise in the sections 2.6, 2.7, 2.8. Furthermore the encoding need not be independent of the internal degrees of freedom $\mu$ (as was the case in eq. (58)).

2.10 Quantum Series Protocol

The previous protocols can loosely be described as using transmission channels in parallel to achieve noise filtration. We may also use the idea of multiple channels in series to filter noise. We illustrate this idea in the case of phase noise; the extension to the more general noise in the previous section is straightforward.

We compare two situations. Given a source channel we wish to improve, we can use the encoding above where we multiplex a single source channel into T transmission channels. This has the effect of causing the noise amplitude to be reduced from $\beta$ to $\beta/\sqrt{T}$, as we showed earlier. If we imagine that the transmission channels have a certain length, l we could perform the same encoding as in the above protocol, but then use the original decoding procedure at the half-way point (or any other point along the transmission channels), then re-perform the encoding, allow the signal to travel for the remaining part of the transmission channel, and finally decode again. As we now show, this protocol gives better error filtration than the protocol without the interior decoding/encoding (assuming that the decoding/encoding module itself does not introduce significant errors). Clearly one could perform the decoding/encoding module at as many interior points as one wishes; we calculate the effect of this below.

Recall first that if we do not carry out multiplexing, the state of a particle passing through channel 1 is $$|1\rangle_R(\alpha|0\rangle_E + \beta|1\rangle_E), \quad (64)$$

whereas if we multiplex into T transmission channels the state of the system plus environment after transmission is $$|1\rangle_R\left(\alpha|0\rangle_E + \frac{\beta}{\sqrt{T}}|1\rangle_E\right). \quad (65)$$

Now we imagine decomposing the transmission channel into two halves. We describe the environment Hilbert space as being the tensor product of two Hilbert spaces, one for the first half ($E_1$), and one for the second half ($E_2$) of the transmission. After the first half (in the absence of multiplexing) the state is $$|1\rangle_R(\alpha'|0\rangle_{E_1} + \beta'|1\rangle_{E_1}), \quad (66)$$

and after the second half it is $$|1\rangle_R(\alpha'|0\rangle_{E_1} + \beta'|1\rangle_{E_1})(\alpha'|0\rangle_{E_2} + \beta'|1\rangle_{E_2}). \quad (67)$$

Comparing with eq. (64), we see that $\alpha'^2 = \alpha$.

If we carry out multiplexing in series on the two halves, we find that the state after transmission is $$|1\rangle_R \left( \alpha'|0\rangle_{E_1} + \frac{\beta'}{\sqrt{T}} |1\rangle_{E_1} \right) \left( \alpha'|0\rangle_{E_2} + \frac{\beta'}{\sqrt{T}} |1\rangle_{E_2} \right). \quad (68)$$

In order to find out the overall probability for an error to have occurred, we write (68) as $$|0\rangle_R (\alpha''|0\rangle_E + \beta''|1''\rangle_E), \quad (69)$$

where $|1''\rangle_E$ is a normalised vector. The probability that the useful receiver state is affected by noise is thus $$|\beta''|^2 = \frac{(1-|\alpha|)(1+2T|\alpha|-|\alpha|)}{T^2}. \quad (70)$$

It is not difficult to check that this probability is less than the probability of error without the insertion of the decoding/encoding module (this is equal to $|\beta|^2/T$) for any $\alpha$.

More generally one can consider what happens if one has a total of q internal decoding/encoding modules. One gets maximally reduction of error probability when these modules are equally spaced along the transmission channel. In this case the total error probability is found to be $$\left[ |\alpha|^{\frac{2}{(q+1)}} + \frac{1-|\alpha|^{\frac{2}{(q+1)}}}{T} \right]^{(q+1)} - |\alpha|^2. \quad (71)$$

We note that this probability tends to $$|\alpha|^{\frac{2(T-1)}{T}} - |\alpha|^2. \quad (72)$$

as the number, q, of internal decoding/encoding modules tends to infinity.

2.11 Quantum Multi-excitation Protocol

In the previous protocols the channels contained only a single excitation each. In the case of bosons, we can also consider the situation where each channel contains many quanta. We will illustrate this first by considering the case that the channel states are coherent states; at the end of this section we show how the protocol may be used for general multi-excitation states.

Let us consider as before two input channels. Each channel is now described by an infinite dimensional Hilbert space and we may describe the states in terms of the creation and annihilation operators:

$$[a_S^1, (a_S^1)^t] = 1; \text{ and } [\tilde{a}_S^1, (\tilde{a}_S^1)^t] = 1, \quad (73)$$

where $a_S^1$ refers to the first channel and $\tilde{a}_S^1$ to the second. We will work in the Schrödinger picture of dynamics. Let the initial state of the system be the following coherent state:

$$N(\lambda) \exp\left( \frac{\lambda}{\sqrt{2}} \left( (a_S^1)^\dagger + e^{i\Phi} (\tilde{a}_S^1)^\dagger \right) \right) |0\rangle_{sys}, \quad (74)$$

where $|0\rangle_{sys}$ is the vacuum state for the system, and $N(\lambda)$ is a normalisation factor. The phase $\Phi$ allows us to transmit a signal; it will also be used later to allow us to measure the effect of the noise.

Let us first consider what happens in the absence of filtration, that is, when there is trivial encoding, namely when each source channel evolves into a single transmission channel. The state of the system evolves to $$N(\lambda) \exp\left( \frac{\lambda}{\sqrt{2}} \left( (a_T^1)^\dagger + e^{i\Phi} (\tilde{a}_T^1)^\dagger \right) \right) |0\rangle_{sys}. \quad (75)$$

The initial state of the environment is a product of states, one for each channel. We denote it $|\xi\rangle_E$. Thus the state of the system plus environment is $$N(\lambda) \exp\left( \frac{\lambda}{\sqrt{2}} \left( (a_T^1)^\dagger + e^{i\Phi} (\tilde{a}_T^1)^\dagger \right) \right) |0\rangle_{sys} |\xi\rangle_E. \quad (76)$$

The effect of the noise is that there is an interaction between the system and environment. This may be modelled by the Hamiltonian of the form $$(a_T^1)^t a_T^1 B^1 + (\tilde{a}_T^1)^t \tilde{a}_T^1 \tilde{B}^1, \quad (77)$$

where $B^1$ and $\tilde{B}^1$ are Hermitian operators acting on the environment Hilbert spaces which we do not need to specify further.

Thus after transmission through the noisy channels, the state becomes $$N(\lambda) \exp\left( \frac{\lambda}{\sqrt{2}} \left( (a_T^1)^\dagger e^{iB^1} + e^{i\Phi} (\tilde{a}_T^1)^\dagger e^{i\tilde{B}^1} \right) \right) |0\rangle_{sys} |\xi\rangle_E. \quad (78)$$

We now decode the signal trivially so that the state at the receiver is $$N(\lambda) \exp\left( \frac{\lambda}{\sqrt{2}} \left( (a_R^1)^\dagger e^{iB^1} + e^{i\Phi} (\tilde{a}_R^1)^\dagger e^{i\tilde{B}^1} \right) \right) |0\rangle_{sys} |\xi\rangle_E. \quad (79)$$

Let us now allow these two receiver channels to interfere. This has the effect of transforming the operators $a_R^1$ and $\tilde{a}_R^1$ into $$(a_R^1) \mapsto \frac{1}{\sqrt{2}} (c_R^1 + d_R^1); \text{ and } (\tilde{a}_R^1) \mapsto \frac{\lambda}{\sqrt{2}} (c_R^1 - d_R^1). \quad (80)$$

We now calculate the current in the channel $c_R^1$. This is the expected value of the operator $$(c_R^1)^t c_R^1 \quad (81)$$

in the final state $$N(\lambda) \exp\left( \frac{\lambda}{\sqrt{2}} (c_R^1)^\dagger \left( e^{iB^1} + e^{i\Phi} e^{i\tilde{B}^1} \right) + \right.$$
$$\left. (d_R^1)^\dagger \left( e^{iB^1} - e^{i\Phi} e^{i\tilde{B}^1} \right) \right) |0\rangle_{sys} |\xi\rangle_E. \quad (82)$$

This expectation value is $$\frac{|\lambda|^2}{4} {}_E\langle\xi|\left(e^{-iB^1} + e^{-i\Phi}e^{-iB^1}\right)\left(e^{iB^1} + e^{i\Phi}e^{iB^1}\right)|\xi\rangle_E. \quad (83)$$

Recall that the state of the vacuum $|\xi\rangle_E$ is a product of states for the individual channels, thus we may write it as $$|\xi\rangle_E = |\xi^1\rangle_E |\tilde{\xi}^1\rangle_E. \quad (84)$$

Thus for example $${}_E\langle\xi|e^{-iB^1}e^{iB^1}|\xi\rangle_E = {}_E\langle\xi^1|e^{-iB^1}|\xi^1\rangle_E \, {}_E\langle\tilde{\xi}^1|e^{iB^1}|\tilde{\xi}^1\rangle_E. \quad (85)$$

We assume, as in our discussions of the previous protocols, that the noise on different channels is independent, thus we write $${}_E\langle\xi^1|e^{-iB^1}|\xi^1\rangle_E = \alpha^*; \quad {}_E\langle\tilde{\xi}^1|e^{iB^1}|\tilde{\xi}^1\rangle_E = \alpha. \quad (86)$$

Therefore the expected value of the current in the channel $c_R^1$ is $$\frac{|\lambda|^2}{2}(1 + |\alpha|^2 \cos\Phi). \quad (87)$$

We now consider what happens when we encode each of the source channels by multiplexing to T transmission channels. We again start with the coherent state (74). We illustrate the noise filtration with the simplest encoding, the analogue of (7). This encoding has the effect of transforming the creation operators in the coherent state into $$(a_S^1)^\dagger \mapsto \frac{1}{\sqrt{T}}\sum_{i=1}^{T}(a_T^i)^\dagger; \quad (\tilde{a}_S^1)^\dagger \mapsto \frac{1}{\sqrt{T}}\sum_{i=1}^{T}(\tilde{a}_T^i)^\dagger. \quad (88)$$

The noise now occurs, causing each creation operator in the coherent state to transform into $$(a_T^i)^\dagger \mapsto e^{iB^i}(a_T^i)^\dagger; \quad (\tilde{a}_T^i)^\dagger \mapsto e^{iB^i}(\tilde{a}_T^i)^\dagger. \quad (89)$$

We now decode with the inverse Fourier transform, and consider the signal in the two receiver channels defined by the creation operators $(a_R^1)^\dagger$ and $(\tilde{a}_R^1)^\dagger$. We again allow these to interfere and finally calculate the expected value of the current $$(c_R^1)^\dagger c_r^1 \quad (90)$$

in the final state. This is $$\frac{|\lambda|^2}{4T^2} {}_E\langle\xi|\left(\sum_{i=1}^{T}\left(e^{-iB^i} + e^{-i\Phi}e^{-iB^i}\right)\right)\left(\sum_{j=1}^{T}\left(e^{iB^j} + e^{i\Phi}e^{iB^j}\right)\right)|\xi\rangle_E = \quad (91)$$

$$\frac{|\lambda|^2}{2}\left(\frac{1+(T-1)|\alpha|^2}{T}\right)\left(1 + \frac{T|\alpha|^2}{1+(T-1)|\alpha|^2}\cos\Phi\right).$$

Exactly as in the previous protocols the multiplexing has the effect of reducing the noise.

So far in this section we have considered a particularly simple initial state, a coherent state. In this case it is rather straightforward to calculate the effect of our filtration protocol. However the protocol may be used for any multi-excitation state.

Let us consider that the state of the source is defined by some function of creation operators $(a_S^1)^\dagger$ acting on the vacuum. The effect of the encoding and decoding that we have performed above is to change this state to one in which the operator $(a_S^1)^\dagger$ is transformed to an expression of the form $$\frac{1}{T}\sum_{j=1}^{T}e^{iB^j}(a_R^1)^\dagger. \quad (92)$$

Thus any power of the operator $((a_S^1)^\dagger)^N$ becomes replaced by $$\frac{1}{T^N}\left(\sum_{j=1}^{T}e^{iB^j}\right)^N ((a_R^1)^\dagger)^N. \quad (93)$$

We now imagine computing the expectation value of some operator in the state. For T much larger than N we can neglect all terms in the expectation value in which any given operator $e^{iB^k}$, say, appears to any power greater than 1. Hence when we compute the expection value, we can perform the inner-product with the state of the environment, and hence replace (93) by $$\frac{1}{T^N}(T\alpha)^N ((a_R^1)^\dagger)^N, \quad (94)$$

where $\alpha$ is the expected value of $e^{iB^k}$ for channel k. Thus in the limit of large T we see that the effect of the protocol is that the source operator $(a_S^1)^\dagger$ gets transformed to $$\alpha (a_1^R)^\dagger. \quad (95)$$

The key point that this protocol achieves (for large T) is that interference between operators is not affected i.e.

$$\frac{1}{\sqrt{2}}\left((a_S^1)^\dagger + e^{i\Phi}(\tilde{a}_S^1)^\dagger\right) \mapsto \alpha\frac{1}{\sqrt{2}}\left((a_R^1)^\dagger + e^{i\Phi}(\tilde{a}_R^1)^\dagger\right). \quad (96)$$

Destruction of interference is avoided and replaced by overall absorption of quanta. This is the exact analogue of what happens for the single-quanta protocols presented earlier where visibility is improved at the cost of overall reduction in intensity.

We note that while we have focused on the case of large T in the previous paragraph, similar analysis shows that, quite generally, even for finite T, multiplexing has the effect of reducing noise and replacing it by an overall reduction in intensity.

2.12 Protocols for Error Filtration for Classical Wave Propagation

The ideas in the previous sections can easily be adapted to filter errors in the propagation of classical waves.

We will consider first how to filter phase noise using a particular protocol which is the precise analogue of the quantum protocol in section 2.6. Let us label the orthonormal modes of the source channels as $\psi_S^i$ and $\phi_S^j$ where i, j=1 . . . S; thus a state of the system may be written as $\Sigma c_i \psi_S^i + \Sigma d_i \phi_S^i$, where $c_i$ and $d_i$ are complex amplitudes. Now let us focus on two particular source modes, $\psi_S^1$ and $\phi_S^1$. We can use the visibility of interference between these modes as a measure of how well the errors are filtered. Specifically we form the state $$\frac{A}{\sqrt{2}}(\psi_S^1 + e^{i\Phi}\phi_S^1), \tag{97}$$

and we calculate how well we can observe $\phi$ after transmission. In all the classical protocols we discuss we will use A to denote a real number. Let us consider the case that there is phase noise in the transmission channel. We label the modes of the transmission channels as $\psi_T^i$ and $\phi_T^j$ where i, j=1 . . . T. These modes interact with the environment and acquire random phases:

$$\psi_T^i \mapsto e^{i\theta_i}\psi_T^i; \quad \phi_T^j \mapsto e^{i\xi_j}\phi_T^j. \tag{98}$$

We assume that the $\theta_i$ and $\xi_j$ are independent and have the same distributions for all i and j; no other properties of these random phases will be needed.

First consider what happens in the case of trivial encoding:

$$\frac{A}{\sqrt{2}}(\psi_S^1 + e^{i\Phi}\phi_S^1) \mapsto \frac{A}{\sqrt{2}}(\psi_T^1 + e^{i\Phi}\phi_T^1) \tag{99}$$

The noise in the transmission channel causes the state to change to $$\frac{A}{\sqrt{2}}(e^{i\theta_1}\psi_T^1 + e^{i\xi_1}e^{i\Phi}\phi_T^1) \tag{100}$$

We now perform trivial decoding into receiver modes:

$$\psi_T^1 \mapsto \psi_R^1; \quad \phi_T^1 \mapsto \phi_R^1. \tag{101}$$

Thus the state becomes $$\frac{A}{\sqrt{2}}(e^{i\theta_1}\psi_R^1 + e^{i\xi_1}e^{i\Phi}\phi_R^1) \tag{102}$$

In order to see the phase $\Phi$ we resolve the state into two components $$\omega_R^1 := \frac{1}{\sqrt{2}}(\psi_R^1 + \phi_R^1); \quad \text{and} \quad z_R^1 := \frac{1}{\sqrt{2}}(\psi_R^1 - \phi_R^1). \tag{103}$$

Thus the state becomes $$\frac{A}{2}((e^{i\theta_1} + e^{i\xi_1}e^{i\Phi})\omega_R^1 + (e^{i\theta_1} - e^{i\xi_1}e^{i\Phi})z_R^1). \tag{104}$$

The phase $\Phi$ may be observed by considering the intensity of the $w_R^1$ component:

$$\frac{A^2}{4}|(e^{i\theta_1} + e^{i\xi_1}e^{i\Phi})|^2. \tag{105}$$

The expected value of this intensity is $$\frac{A^2}{4}\overline{|(e^{i\theta_1} + e^{i\xi_1}e^{i\Phi})|^2} = \frac{A^2}{4}(2 + \overline{e^{i\theta_1}e^{-i\xi_1}}e^{-i\Phi} + \overline{e^{-i\theta_1}e^{i\xi_1}}e^{+i\Phi}). \tag{106}$$

However $$\overline{e^{i\theta_1}e^{-i\xi_1}} = \alpha, \tag{107}$$

for some complex number $\alpha$ which has modulus less than or equal to 1. Thus the expected value of this intensity is $$\frac{A^2}{2}(1 + |\alpha|^2\cos\Phi), \tag{108}$$

and the visibility is $$\frac{I_{\max} - I_{\min}}{I_{\max} + I_{\min}} = |\alpha|^2. \tag{109}$$

Now let us consider multiplexing the source as in the previous quantum protocols.

The encoding step, rather than the trivial encoding (99), is $$\frac{A}{\sqrt{2}}(\psi_S^1 + e^{i\Phi}\phi_S^1) \mapsto \frac{A}{\sqrt{2T}}\left(\sum_{j=1}^{T}\psi_T^j + e^{i\Phi}\sum_{j=1}^{T}\phi_T^j\right). \tag{110}$$

This encoding can be thought of as a Fourier transform, as in the quantum case.

The noise in the transmission channel causes the state to change to $$\frac{A}{\sqrt{2T}}\left(\sum_{j=1}^{T}\psi_T^j e^{i\theta_j} + e^{i\Phi}\sum_{j=1}^{T}\phi_T^j e^{i\xi_j}\right), \tag{111}$$

where, as before $\theta_i$ and $\xi_j$ are random phases with the same distribution for all i and j.

We now perform decoding into receiver modes:

$$\psi_T^j \mapsto \frac{1}{\sqrt{T}}\sum_{k=1}^{T}e^{2i\pi j(k-1)/T}\psi_R^k; \quad \phi_T^j \mapsto \frac{1}{\sqrt{T}}\sum_{k=1}^{T}e^{2i\pi j(k-1)/T}\phi_R^k. \tag{112}$$

As before we focus in the receiver channels $\psi_R^1$ and $\phi_R^1$. The terms in the state containing these channels are $$\frac{A}{\sqrt{2T^2}}\left(\left(\sum_{k=1}^{T}e^{i\theta_k}\right)\psi_R^1 + \left(\sum_{k=1}^{T}e^{i\varepsilon_k}\right)e^{i\Phi}\phi_R^1\right) \quad (113)$$

As before, in order to see the phase $\Phi$ we resolve the state into two components $$\omega_R^1 := \frac{1}{\sqrt{2}}(\psi_R^1 + \phi_R^1); \text{ and } z_R^1 := \frac{1}{\sqrt{2}}(\psi_R^1 - \phi_R^1). \quad (114)$$

The phase $\Phi$ may be observed by considering the intensity of the $W_R^1$ component:

$$\frac{A^2}{4T^2}\left|\left(\sum_{k=1}^{T}e^{i\theta_k}\right) + \left(\sum_{k=1}^{T}e^{i\varepsilon_k}\right)e^{i\Phi}\right|^2. \quad (115)$$

The expected value of this intensity is $$\frac{A^2}{2}\left(\frac{1+(T-1)|\alpha|^2}{T}\right)\left(1 + \frac{T|\alpha|^2}{1+(T-1)|\alpha|^2}\cos\Phi\right). \quad (116)$$

Thus the visibility is $$\frac{T|\alpha|^2}{1+(T-1)|\alpha|^2}. \quad (117)$$

This visibility increases monontonically with T and tends to one as $T\to\infty$.

The protocol we have described is the analogue of the simple Fourier transform protocol for quantum signals in section 2.6. Not surprisingly they give the same visibility as the coherent states analysed in section 2.11. This protocol may easily be generalised as in sections 2.7 and 2.8. We also note that while it is important for the protocol that the noise in each channel was independent, it is less important that the noise in different channels is identically distributed. The exact extent to which the noise is filtered will depend on these distributions. However the protocol will still reduce the noise even if the distributions are not the same.

2.13 Classical Channels with Internal Degrees of Freedom

Let us now consider the case that the classical channels have internal degrees of freedom and that the noise has the effect of performing random rotations on these internal degrees of freedom.

Let us label the orthonormal modes of the source channels $\psi_S^{i\mu}$ and $\phi_S^{j\nu}$ where $i, j=1 \ldots S$ label the different channels and $\mu, \nu=1 \ldots I$ label the different internal degrees of freedom. For simplicity of notation, however, we will use a vector notation and denote vectors of orthonormal modes by $\Psi_S^i$ and $\Phi_S^j$ (i.e. for each i, $\Psi_S^i$ is an I component vector).

For simplicity of explanation, we will, as before, focus on two particular source modes, $\Psi_S^1$ and $\Phi_S^1$ (it is straightforward to see the effect on a larger number of source modes in a general incoming state). We use the visibility of interference between these modes as a measure of how well the errors are filtered. Specifically we form the superposition $$\frac{A}{\sqrt{2}}(\Psi_S^1 + U\Phi_S^1). \quad (118)$$

U is a unitary transformation (rotation) on $\Phi_S^1$ and we will calculate how well we can observe U after transmission.

The noise in the transmission channels takes the following form. We label the modes of the transmission channels as $\Psi_T^i$ and $\Phi_T^j$ where $i, j=1 \ldots T$. These modes interact with the environment and acquire random rotations:

$$\Psi_T^i \mapsto U_i\Psi_T^i; \Phi_T^j \mapsto V_j\Phi_T^j. \quad (119)$$

We assume that the random unitary transformations $U_i$ and $V_j$ are independent and have the same distributions for all i and j; no other properties of these random rotations will be needed.

We now encode the source states using the Fourier transform, exactly as in the previous protocol:

$$\frac{A}{\sqrt{2}}(\Psi_S^1 + U\Phi_S^1) \mapsto \frac{A}{\sqrt{2T}}\left(\sum_{j=1}^{T}\Psi_T^j + U\sum_{j=1}^{T}\Phi_T^j\right). \quad (120)$$

The decoding will also be via the Fourier transform:

$$\Psi_T^j \mapsto \frac{1}{\sqrt{T}}\sum_{k=1}^{T}e^{2i\pi j(k-1)/T}\Psi_R^k; \Phi_T^j \mapsto \frac{1}{\sqrt{T}}\sum_{k=1}^{T}e^{2i\pi j(k-1)/T}\Phi_R^k. \quad (121)$$

As before we focus in the receiver channels $\Psi_R^1$ and $\Phi_R^1$ and consider the two combinations $$w_R^1 := \frac{1}{\sqrt{2}}(\Psi_R^1 + \Phi_R^1); \text{ and } z_R^1 := \frac{1}{\sqrt{2}}(\Psi_R^1 - \Phi_R^1). \quad (122)$$

Finally we calculate the expected value of the intensity of the $w_R^1$ component. If we call B the expected value of the random unitaries $U_i$ and $V_j$, we find that this intensity is $$\frac{A^2}{2T}\left(1 + (T-1)w_R^{1\dagger}B^\dagger Bw_R^1 + Tw_R^{1\dagger}B^\dagger\left(\frac{U+U^\dagger}{2}\right)Bw_R^1\right). \quad (123)$$

If there is no noise, this intensity is equal to $$\frac{A^2}{2T}\left(1 + w_R^{1\dagger}\left(\frac{U+U^\dagger}{2}\right)w_R^1\right), \quad (124)$$

with or without multiplexing. If the noise is uniform over the internal degrees of freedom, i.e. $B=\alpha(\text{id})$ for some complex number a then the protocol improves the visibility and one finds that the output intensity is $$\frac{A^2}{2T}(1+(T-1)|\alpha|^2)\left(1+\frac{T|\alpha|^2}{1+(T-1)|\alpha|^2}w_R^{1\dagger}\left(\frac{U+U^\dagger}{2}\right)w_R^1\right). \quad (125)$$

If the noise is not uniform (i.e. different internal degrees of freedom are degraded differently), then we must further process the signal by acting with a decreasing operator C which has the property that $CB=\beta(id)$ for some complex number $\beta$. Then the visibility is again improved as before with $\alpha$ replaced by $\beta$.

As with the case of quantum mechanical signals where the channels have internal degrees of freedom, this protocol can be generalised to use much more general encoding and decoding schemes.

2.14 Non-linear Noise

We now note that the previous protocols are also effective in the case that the noise is non-linear, in other words where the noise distribution depends on the amplitude. Let us first consider the case of classical signals without internal degrees of freedom as in section 2.12. Let us say that the transmission states $\psi_T^i$ and $\phi_T^j$ have complex amplitudes $A_i$ and $B_j$ respectively. We consider initially that the noise in the transmission channels depends on these modulus of these complex amplitudes:

$$A_i\psi_T^i \mapsto A_i e^{i\theta_i(|A_i|)}\psi_T^i; \quad B_j\phi_T^j \mapsto B_j e^{i\xi_j(|B_j|)}\phi_T^j. \quad (126)$$

We still consider the noise to be independent in different channels. Thus if the transmission signal is $$\sum_{i=1}^T A_i \psi_T^i + \sum_{j=1}^T B_j \phi_T^j, \quad (127)$$

the noise transforms the signal to $$\sum_{i=1}^T A_i e^{i\theta_i(|A_i|)}\psi_T^i + \sum_{j=1}^T B_j e^{i\xi_j(|B_j|)}\phi_T^j. \quad (128)$$

We now consider exactly the same situation as in section 2.12. We start with the superposition $$\frac{A}{\sqrt{2}}(\psi_S^1 + e^{i\Phi}\phi_S^1), \quad (129)$$

we mulitplex both $\psi_S^1$ and $\phi_S^1$ to T transmission channels and consider the $w_R^1$ component of the signal at the receiver. The amplitude of this component is $$\frac{A}{\sqrt{4T^2}}\left(\left(\sum_{k=1}^T e^{i\theta_k\left(\frac{A}{\sqrt{2T}}\right)}\right)+\left(\sum_{k=1}^T e^{i\xi_k\left(\frac{A}{\sqrt{2T}}\right)}\right)e^{i\Phi}\right). \quad (130)$$

The expected value of the random, amplitude-dependent, phases are $$\overline{e^{i\theta_k\left(\frac{A}{\sqrt{2T}}\right)}}=\overline{e^{i\xi_k\left(\frac{A}{\sqrt{2T}}\right)}}=a\left(\frac{A}{\sqrt{2T}}\right), \quad (131)$$

where this expected value depends on the amplitude in each transmission channel. Computing the visibility of the interference fringes, one finds the same result as when the noise is linear eq. (117), but now the constant $\alpha$ is replaced by the function (131).

The improvement of the visibility combines two effects: first of all the increase of the visibility as T increases that was already apparent in eq. (117); and secondly the decrease of $$a\left(\frac{A}{\sqrt{2T}}\right)$$

as T increases (since one expects the non-linearity of the noise to decrease with decreasing intensity). That is, the multiplexing reduces the amplitude in each channel, and hence decreases the effects of any non-linearities. If the input modes have different intensities the situation is a little less straight-forward than the case when the intensities are equal, as in (129). However the multiplexing still helps to reduce the effect of the noise. This is particularly the case when the number of transmission channels T is large enough so that the function a becomes independent of the amplitude which will often be the case when the amplitude of the signal in a mode become small (as will be the case for large enough T). In this limit, the protocol works just as in the previous sections when the noise was assumed to be independent of the intensity. A similar remark also applies in the case that the phase disturbance ($\theta_i$ and $\xi_i$ in this section) depend on the phase of the signal as well as its intensity; as T increases we expect this disturbance to be less and less significant since, as T increases the noise is likely to become independent of the phase of this signal.

2.15 Classical and Quantum Amplitude Noise

In all the previous protocols we considered the noise to be amplitude preserving. We now show using simple examples that our protocols also improve amplitude noise.

We first consider the simplest example in the classical case. Recall that the simplest classical channel (section 2.12) was where the amplitude in each channel was described by a complex number (i.e. there were no internal degrees of freedom) and that the noise has the effect that the amplitudes in the transmission channels, $\psi_T^i$ and $\phi_T^j$, became multiplied by a random phase:

$$\psi_T^i \mapsto e^{i\theta_i}\psi_T^i; \quad \phi_T^j \mapsto e^{i\xi_j}\phi_T^j. \quad (132)$$

However it might be the case that rather than just being modified by random phases, these amplitude gets multiplied by a random complex number which need not have amplitude 1:

$$\psi_T^i \mapsto \beta_i\psi_T^i; \quad \phi_T^j \mapsto \gamma_j\phi_T^j. \quad (133)$$

We now show that the previous classical protocols are also effective in this case. As before, we consider the noise to be independent in different channels.

We now consider exactly the same situation as in sections 2.12, 2.14. We start with the superposition $$\frac{A}{\sqrt{2}}(\psi_S^1 + e^{i\Phi}\phi_S^1), \quad (134)$$

we mulitplex both $\psi_S^1$ and $\phi_S^1$ to T transmission channels and consider the $w_R^1$ component of the signal at the receiver. The amplitude of this component is $$\frac{A}{\sqrt{4T^2}}\left(\left(\sum_{k=1}^{T}\beta_i\right) + \left(\sum_{k=1}^{T}\gamma_i\right)e^{i\Phi}\right). \quad (135)$$

Let us write the expection value of the random amplitudes as $$\overline{\beta_i} = \overline{\gamma_i} = \beta$$

$$\overline{\beta_i\beta_i^*} = \overline{\gamma_i\gamma_i^*} = B^2 \quad (136)$$

where β is a complex number of modulus less than one and B is real (there is no summation in the terms in the second line). We note that $$\beta\beta^* \leq B^2 \quad (137)$$

The intensity observed at the receiver channel may be calculated to be $$\frac{A^2}{2}\left(\frac{B^2 + (T-1)|\beta|^2}{T}\right)\left(1 + \frac{T|\beta|^2}{B^2 + (T-1)|\beta|^2}\cos\Phi\right). \quad (138)$$

Thus we see that the multiplexing will reduce the effect of amplitude noise, exactly as in the case of phase noise.

Now consider, as an illustration, the quantum case in which a single particle is affected both by phase noise and amplitude noise; this is an illustration. In this case the evolution during transmission (3) is replaced by $$|j>_T|0>_E \longmapsto |j>_T(\alpha|0>_E + \beta|j>_E) + \gamma|abs_j>_{T,E} \quad (139)$$

where γ is the amplitude that the particle is absorbed during transmission and $|abs_j>_E$ is the state of the system plus environment if the particle is absorbed in transmission channel j. Using this noise model, all the calculations of section 2.16 follow through unchanged except that $|\alpha|^2 + |\beta|^2 = 1 - |\gamma|^2 < 1$. In particular eq. (24), is unchanged, and hence we see that multiplexing improves the quality of the channel (and hence the quality of the interference) when both amplitude and phase noise occurs.

It may be checked that all the protocols we have described improve the quality of transmission in the case of amplitude noise.

2.16 Protocols for Communication of Entangled States

All the previous protocols are error-filtration schemes for one-way communication of quantum and classical signals. We now show the these ideas may be extended to provide protocols for situations where the goal is to send entangled quantum states from a source to two or more parties.

Firstly however let us note that if the goal is simply to set up entangled states between a number of parties, this may be achieved, and the errors diminished, by using the previous quantum protocols: one of the parties simply prepares the state locally and transmits it using the one-way communication channels we have described earlier.

In what follows we will mostly concentrate, for explicitness, on protocols for transmission of a state from a source to two parties; it is clear that related ideas may be used to transmit a state from a source to three or more parties.

In more detail the set-up is as follows. The source (4.01 in FIG. 4) emits two S-level systems (4.08.1 and 4.08.2 in FIG. 4). These are encoded by the encoders (4.04.1 and 4.04.2 in FIG. 4) as T-level systems. The signals then flow through the noisy channels, (4.03.1 and 4.03.2 in FIG. 4), are decoded by the decoders (4.05.1 and 4.05.2 in FIG. 4) to R-level systems (4.09.1 and 4.09.2 in FIG. 4). As with the protocols for one-way communication above, a novel aspect of the protocols we describe are the realisation that it is important to allow the encoding and decoding to change the dimension of the space of states; this is key to the performance of the protocols.

Again, as with the earlier protocols, an important feature of the implementations we consider is the form of the Hilbert space of states as a direct sum of the Hilbert spaces of the individual transmission channels. Associated with this is the fact that the dominant type of noise has a very specific form: the noise on different channels is independent. It is the particular form of the noise which allows our protocols to work.

For simplicity in this section we consider the case of phase noise. Just as in the one-way protocols, it is straightforward to generalise the protocols to the case of more general noise. We consider that any transmission state $|j>_T$ interacts with the environment as $$|j>_T|0>_E \longmapsto |j>_T(\alpha|0>_E + \beta|j>_E) \quad (140)$$

where the environment states $|j>_E$ are orthogonal for different j.

The protocols we describe have the following general structure. States of system A come from the source:

$$|i>_S^A \quad (i=1\ldots S) \quad (141)$$

These states are encoded by the encoder (4.04.1 in FIG. 4) by a transformation $U_A^E$; thus the state of the system which emerges is $$U_e^A|i>_S^A = \sum_{j=1}^{T} {}^A\langle j| U_e^A|i>_S^A|j>_T^A. \quad (142)$$

Thus the initial state of the system plus environment of the channel is thus $$\sum_{j=1}^{T} {}^A\langle j| U_e^A|i>_S^A|j>_T^A|0>_E^A. \quad (143)$$

After transmission through the channel the state becomes $$\sum_{j=1}^{T} {}^A\langle j| U_e^A|i>_S^A|j>_T^A(\alpha_{jA}|0>_E^A + \beta_{jA}|j>_E^A). \quad (144)$$

The decoding acts by a further transformation $U_d^A$ thus the final state after encoding and decoding is $$\sum_{j=1}^{T} {}^A_T\langle j|U_e^A|i\rangle^A_S \, U_d^A|j\rangle^A_T(\alpha_{jA}|0\rangle^A_E + \beta_{jA}|j\rangle^A_E). \tag{145}$$

Finally, only some of the receiver states are used. This is accomplished by projecting the final state on a Hilbert subspace of receiver states of dimension R. We will denote this projector by $\Pi^A$. There is a certain liberty in choosing this projector as one can modify the projector by a unitary transformation which, on the other hand, can be absorbed into the definition of $U_d^A$. For concreteness, we fix this arbitrariness by defining $$\Pi^A = \sum_{l=1}^{R} |k\rangle^A_R{}^A_R\langle k|. \tag{146}$$

Thus when starting with the initial state $|i\rangle_S^A|0\rangle_E^A$ we end up with the (unnormalized) state $$\sum_{j=1}^{T} {}^A_T\langle j|U_e^A|i\rangle^A_S \, \Pi^A U_d^A|j\rangle^A_T(\alpha_{jA}|0\rangle^A_E + \beta_{jA}|j\rangle^A_E). \tag{147}$$

Party B performs similar operations on its state.

A given protocol is a choice of the dimensions of the different Hilbert spaces at each time, and of the encoding and decoding operations. Below we shall give some specific examples of these choices.

2.16.1 Protocol 1: Multiplexing at the Source

In this example the task is to share an R-dimensional maximally entangled state. The protocol works by preparing an S-level system (S>R), allowing it to be transmitted through the noisy channel, and then processing it at the end (i.e. the encoding between the source and receiver channels is trivial and T=S). The protocol allows the two parties to end up with a final state of their R-level systems which has higher fidelity than would have been achieved if the R-level system were simply transmitted directly through the channel. We call our method "multiplexing at source" because we use a source which produces more entanglement than the one state we wish to produce at the receivers (S>R). It is this which enables us to obtain a state at the receivers which is closer to the required state than that we would have obtained had we started with the source simply producing an R-dimensional entangled state.

Consider the initial state $$|\psi_{in}\rangle = \frac{1}{\sqrt{S}} \sum_{i=1}^{S} |i\rangle_S^A|i\rangle_S^B|0\rangle_E^A|0\rangle_E^B. \tag{148}$$

The first condition defining this protocol is that the encoding stage is trivial. This means that $${}^A_T\langle j|U_e^A|i\rangle_S^A = {}^B_T\langle j|U_e^B|i\rangle_S^B = \delta_{ij} \tag{149}$$

Thus the un-normalised state of the system after decoding and projection is $$|\psi_{fin}\rangle = \frac{1}{\sqrt{S}} \sum_{i=1}^{S} \Pi^A \Pi^B U_d^A U_d^B |i\rangle_T^A|i\rangle_T^B(\alpha|0\rangle_E^A + \beta|i\rangle_E^A)(\alpha|0\rangle_E^B + \beta|i\rangle_E^B) \tag{150}$$

We are interested in the maximum fidelity to an R-level $|\psi_R\rangle$ singlet that we can produce $$|\psi_R\rangle = \frac{1}{\sqrt{R}} \sum_{i=1}^{R} |i\rangle_R^A|i\rangle_R^B. \tag{151}$$

The fidelity of the state $|\psi_{fin}\rangle$ is $$F = \frac{|\langle \psi_R|\psi_{fin}\rangle|^2}{\langle \psi_{fin}|\psi_{fin}\rangle} \tag{152}$$

We now introduce the second condition defining the protocol, namely that $U_d^A$ and $U_d^B$ should be related by being essentially the complex conjugates of each other in the bases we are using. i.e. If we write $$U_d^A|i\rangle_T^A = \sum_j u_{ij}|j\rangle_R^A \tag{153}$$

then $$U_d^B|i\rangle_T^B = \sum_j u_{ij}^*|j\rangle_R^B. \tag{154}$$

This means in particular that $$U_d^A U_d^B \sum_i |i\rangle_T^A|i\rangle_T^B = \sum_i |i\rangle_R^A|i\rangle_R^B. \tag{155}$$

Now let us compute $$\langle \psi_{fin}|\psi_{fin}\rangle = \frac{1}{S} \sum_{i,i'=1}^{S} {}^A_T\langle i'|^B_T\langle i'|(U_d^A)^\dagger (U_d^B)^\dagger \Pi^A \Pi^B U_d^A U_d^B |i\rangle_T^A|i\rangle_T^B \times \tag{156}$$

$$[|\alpha|^4 + (1-|\alpha|^4)\delta_{i,i'}]$$

$$= \frac{|\alpha|^4}{S} \sum_{i,i'=1}^{S} {}^A_T\langle i'|^B_T\langle i'|(U_d^A)^\dagger (U_d^B)^\dagger \Pi^A \Pi^B U_d^A U_d^B |i\rangle_T^A|i\rangle_T^B +$$

$$\frac{1-|\alpha|^4}{S} \sum_{i=1}^{S} {}^A_T\langle i|^B_T\langle i|(U_d^A)^\dagger (U_d^B)^\dagger \Pi^A \Pi^B U_d^A U_d^B |i\rangle_T^A|i\rangle_T^B.$$

It may be calculated that $$\langle \psi_{fin}|\psi_{fin}\rangle = \frac{|\alpha|^4 R}{S} + \frac{1-|\alpha|^4}{S} \sum_{i=1}^{S} \left({}^A_T\langle i|(U_d^A)^\dagger \Pi^A U_d^A|i\rangle_T^A\right)^2. \tag{157}$$

Where we have used the fact that $$^A_T\langle i|(U^A_d)^\dagger \Pi^A U^A_d|i\rangle^A_T = {}^B_T\langle i|(U^B_d)^\dagger \Pi^B U^B_d|i\rangle^B_T \quad (158)$$

$$\text{Also } |\langle \psi_R | \psi_{fin}\rangle|^2 = \frac{|\alpha|^4 R}{S} + \frac{1-|\alpha|^4}{RS}\sum_{i=1}^{S}\left({}^A_T\langle i|(U^A_d)^\dagger \Pi^A U^A_d|i\rangle^A_T\right)^2. \quad (159)$$

Thus we may write the fidelity as $$F = \frac{|\langle \psi_R | \psi_{fin}\rangle|^2}{\langle \psi_{fin} | \psi_{fin}\rangle} = \left(\frac{|\alpha|^4 R}{S} + \frac{1-|\alpha|^4}{S}\frac{Y}{R}\right)\left(\frac{|\alpha|^4 R}{S} + \frac{1-|\alpha|^4}{S}Y\right)^{-1} \quad (160)$$

where $$Y = \sum_{i=1}^{S}\left({}^A_T\langle i|(U^A_d)^\dagger \Pi^A U^A_d|i\rangle^A_T\right)^2. \quad (161)$$

Y is a positive quantity and by Schwarz's inequality $$Y = \sum_{i=1}^{S}\left({}^A_T\langle i|(U^A_d)^\dagger \Pi^A U^A_d|i\rangle^A_T\right)^2 \geq \frac{1}{S}\left(\sum_{i=1}^{S}{}^A_T\langle i|(U^A_d)^\dagger \Pi^A U^A_d|i\rangle^A_T\right)^2. \quad (162)$$

But $$\sum_{i=1}^{S}{}^A_T\langle i|(U^A_d)^\dagger \Pi^A U^A_d|i\rangle^A_T = R. \quad (163)$$

Thus $$Y \geq \frac{R^2}{S} \quad (164)$$

with equality when $$^A_T\langle i|(U^A_d)^\dagger \Pi^A U^A_d|i\rangle^A_T = \frac{R}{S} \text{ for all } i. \quad (165)$$

We will impose (165) as the third condition defining this protocol. In this case, the fidelity is $$F = \left(\frac{|\alpha|^4 R}{S} + \frac{1-|\alpha|^4}{S}\frac{R}{S}\right)\left(\frac{|\alpha|^4 R}{S} + (1-|\alpha|^4)\left(\frac{R}{S}\right)^2\right)^{-1}. \quad (166)$$

We see that by increasing the amount of entanglement produced by the source, (i.e. by increasing S), the fidelity is increased.

2.16.2 Protocol 2

We may also use the protocols for error filtration presented in sections 2.6, 2.7, 2.8 directly to filter errors when communicating entangled quantum states. We can think of the protocols in sections 2.6, 2.7, 2.8 as ways of improving a given transmission channel: by multiplexing each source channel to T transmission channels we can reduce the error amplitude from $\beta$ to $\beta/\sqrt{T}$.

Consider, then, that a source prepares a state of two S level systems. This state is pre-processed by multiplexing each source channel into T transmission channels using a general encoding as given in section 2.7. The signal is then decoded and post-processed to yield a state at the two receivers $R_A$ and $R_B$. The received state will be of higher fidelity than if the pre- and post-processing had not been used.

Consider for example the following input state $$|\psi_{in}\rangle = \sum_{i=1}^{S} a_i|i\rangle^A_S|i\rangle^B_S, \quad (167)$$

where $a_i$ are complex amplitudes (this is essentially the most general bi-partite state). If each source channel is processed through T transmission channels, in such a way that the original error amplitude is reduced from $\beta$ to $\beta/\sqrt{T}$, then the final state is $$|\psi_{fin}\rangle = \sum_{i=1}^{S} a_i|i\rangle^A_S|i\rangle^B_S\left(\alpha|0\rangle^A_E + \frac{\beta}{\sqrt{T}}|i\rangle^A_E\right)\left(\alpha|0\rangle^B_E + \frac{\beta}{\sqrt{T}}|i\rangle^B_E\right). \quad (168)$$

The fidelity of the state at the receivers to the state which would have been transmitted if there were no noise $$\left(\text{i.e. } \sum_{i=1}^{S} a_i|i\rangle^A_R|i\rangle^B_R\right)$$

is $$F = \frac{|\langle \psi_{in} | \psi_{fin}\rangle|^2}{\langle \psi_{fin} | \psi_{fin}\rangle}$$

$$= \frac{|\alpha|^4 + [(|\alpha|^2 + |\beta|^2/T)^2 - |\alpha|^4]\sum_{i=1}^{S}|a_i|^4}{(|\alpha|^2 + |\beta|^2/T)^2}. \quad (169)$$

Thus the fidelity increases monotonically with T and tends to 1 as $T \to \infty$.

3 Physical Implementations of Error Filtration 3.1 Example of the Implementation of the Simple Error Filtration Protocols in Optical Fibres.

Figure 5:
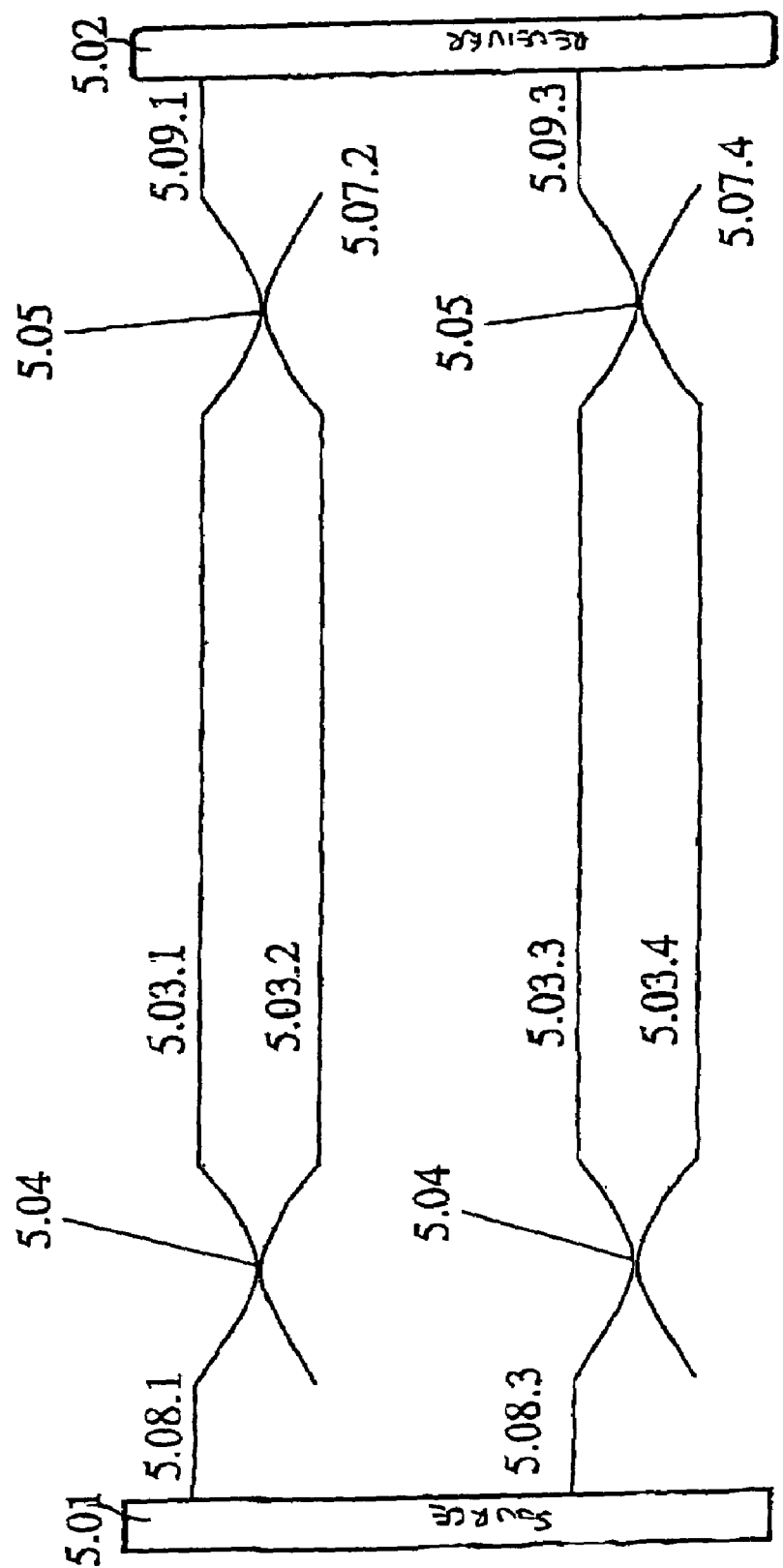
FIG. 5—Example of the implementation of the simple error filtration protocols in optical fibres.

This is illustrated in FIG. 5. For concreteness we consider the case in which there are two source channels and four transmission channels. The source 5.01 sends signals down two optical fibres: the source channels 5.08.1 and 5.08.3. The encoding is performed by using optical couplers as encoders 5.04. The signal then travels along the noisy transmission fibres 5.03.1-5.03.4. The decoders, 5.05, are also optical couplers. The signal is collected at the receivers 5.02; the useful channels are 5.09.1 and 5.09.3; the signals appearing at the other two channels, 5.07.2 and 5.07.4, are pure noise and are discarded. Note that the pairs of transmission fibers 5.03.1 and 5.03.2 (or 5.03.3 and 5.03.4) constitute an interferometer. The optical length of these two fibers must be equal so that in the absence of noise a signal emitted by the source in fiber 5.08.1 (or 5.08.3) is recovered with certainty in fiber 5.09.1 (or 5.09.3).

This hardware can be used for many of the protocols we describe in the text: single photon quantum signals, states with internal degrees of freedom, multi-photon quantum states and classical signals.

In the case of single photon quantum states the two source channels carry the states $|1\rangle_S$ and $|3\rangle_S$ (for consistency with the notation in the text) and the four transmission channels carry the states $|i\rangle_T$, $i=1\ldots 4$. The state of the photon in the source fibres 5.08.1 and 5.08.3 is $a|1\rangle_S+b|3\rangle_S$ where $a$ and $b$ are complex numbers, $|a|^2+|b|^2=1$. The state emerging from the encoders 5.04 is $$\frac{a}{\sqrt{2}}(|1\rangle_T+|2\rangle_T)+\frac{b}{\sqrt{2}}(|3\rangle_T+|4\rangle_T).$$

The signal then travels along the noisy transmission fibres 5.03.1-5.03.4. The upper decoder causes the transformations $$|1\rangle_T\mapsto\frac{1}{\sqrt{2}}(|1\rangle_R-|2\rangle_R)\text{ and }|2\rangle_T\mapsto\frac{1}{\sqrt{2}}(|1\rangle_R+|2\rangle_R);$$

the lower decoder causes the transformations $$|3\rangle_T\mapsto\frac{1}{\sqrt{2}}(|3\rangle_R-|4\rangle_R)$$

and $$|4\rangle_T\mapsto\frac{1}{\sqrt{2}}(|3\rangle_R+|4\rangle_R).$$

The states in the useful channels 5.09.1 and 5.09.3 are $|1\rangle_R$ and $|3\rangle_R$, respectively.

In the case of classical wave signals the two source channels carry the modes $\psi_S^1$ and $\phi_S^1$ (for consistency with the notation in the text) and the four transmission channels carry the modes $\psi_T^1$, $\psi_T^2$, $\phi_T^1$ and $\phi_T^2$. The signal in the source fibres 5.08.1 and 5.08.3 is $a\psi_S^1+b\phi_S^1$ where $a$ and $b$ are complex numbers, with $|a|^2+|b|^2$ equal to the total intensity emitted by the source. The state emerging from the encoders 5.04 is $$\frac{a}{\sqrt{2}}(\psi_T^1+\psi_T^2)+\frac{b}{\sqrt{2}}(\phi_T^1+\phi_T^2).$$

The signal then travels along the noisy transmission fibres 5.03.1-5.03.4. The upper decoder causes the transformations $$\psi_T^1\mapsto\frac{1}{\sqrt{2}}(\psi_R^1-\psi_R^2)$$

and $$\psi_T^2\mapsto\frac{1}{\sqrt{2}}(\psi_R^1+\psi_R^2);$$

the lower decoder causes the transformations $$\phi_T^1\mapsto\frac{1}{\sqrt{2}}(\phi_R^1-\phi_R^2)\text{ and }\phi_T^2\mapsto\frac{1}{\sqrt{2}}(\phi_R^1+\phi_R^2).$$

The states in the useful channels 5.09.1 and 5.09.3 are $\psi_R^1$ and $\phi_R^1$, respectively.

Filtration of the other types of signal listed above works in very similar ways, as described in detail in part 2.

We note that we have not made use of any internal degrees of freedom of the signals in the above examples. In the case of single photon states we could slightly change the implementation encoding the signal in the two polarisation states $|H\rangle$ and $|V\rangle$ of the photon. Thus using these internal degrees of freedom we need only use one source channel and two transmission channels. The signal could be encoded as $a|H\rangle_S+b|V\rangle_S$. The encoding and decoding would be carried out by a single non-polarising beam-splitter. As long as the noise for all four components of the transmission signal (horizontal and vertical polarization in each of two fibres) is independent, the protocol will work exactly as above.

3.2 Example of the Implementation of the Simple Error Filtration Protocols Optically in Free Space.

Figure 6:
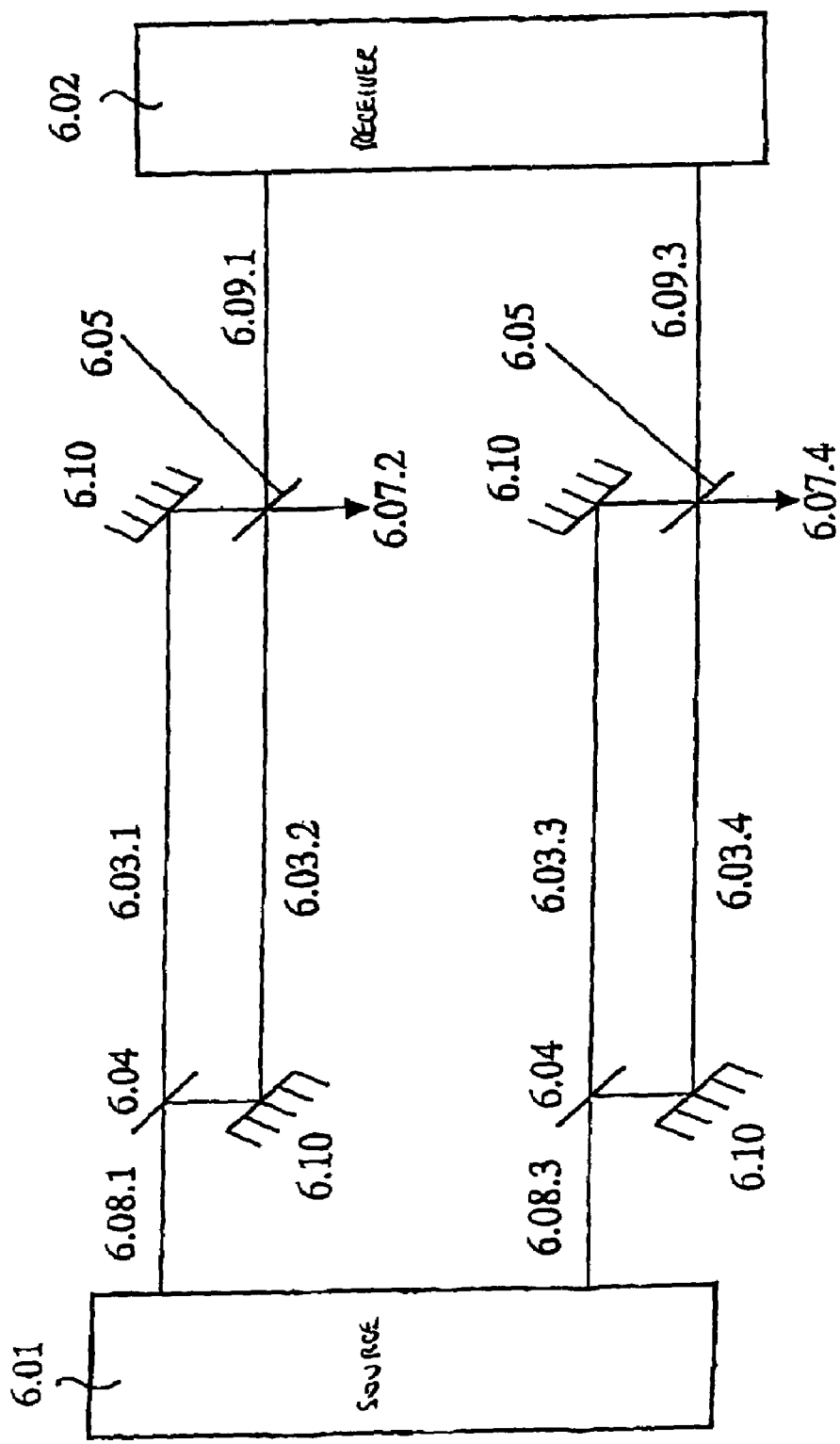
FIG. 6—Example of the implementation of the simple error filtration protocols optically in free space.

This is illustrated in FIG. 6, and is very similar to the implementations in the previous section except that rather than being sent through optical fibres, the signal is sent through free space. Thus the optical elements are different. As in the examples in the previous section, for concreteness we consider the case in which there are two source channels and four transmission channels. The source 6.01 sends signals into free space: the source channels 6.08.1 and 6.08.3. The encoding is performed by using beam splitters as encoders 6.04. The signal then travels along the noisy transmission paths 6.03.1-6.03.4; these signal paths should have the same optical length. The signals must be directed to the output and so mirrors 6.10 are needed to direct the signal. The decoders, 6.05, are also beam-splitters. The signal is collected at the receivers 6.02; the useful channels are 6.09.1 and 6.09.3; the signals appearing at the other two channels, 6.07.2 and 6.07.4, are pure noise and are discarded.

As in the implementations in optical fibres in the previous section, this hardware can be used for many of the protocols we describe in the text: single photon quantum signals, states with internal degrees of freedom, multi-photon quantum states and classical signals.

The mathematical description of the states of the system during the transmission are exactly the same as in the previous implementations and so are not repeated here.

3.3 Example of the Implementation of the Simple Error Filtration Protocols Using Time-bins in Optical Fibres.

Figure 7:
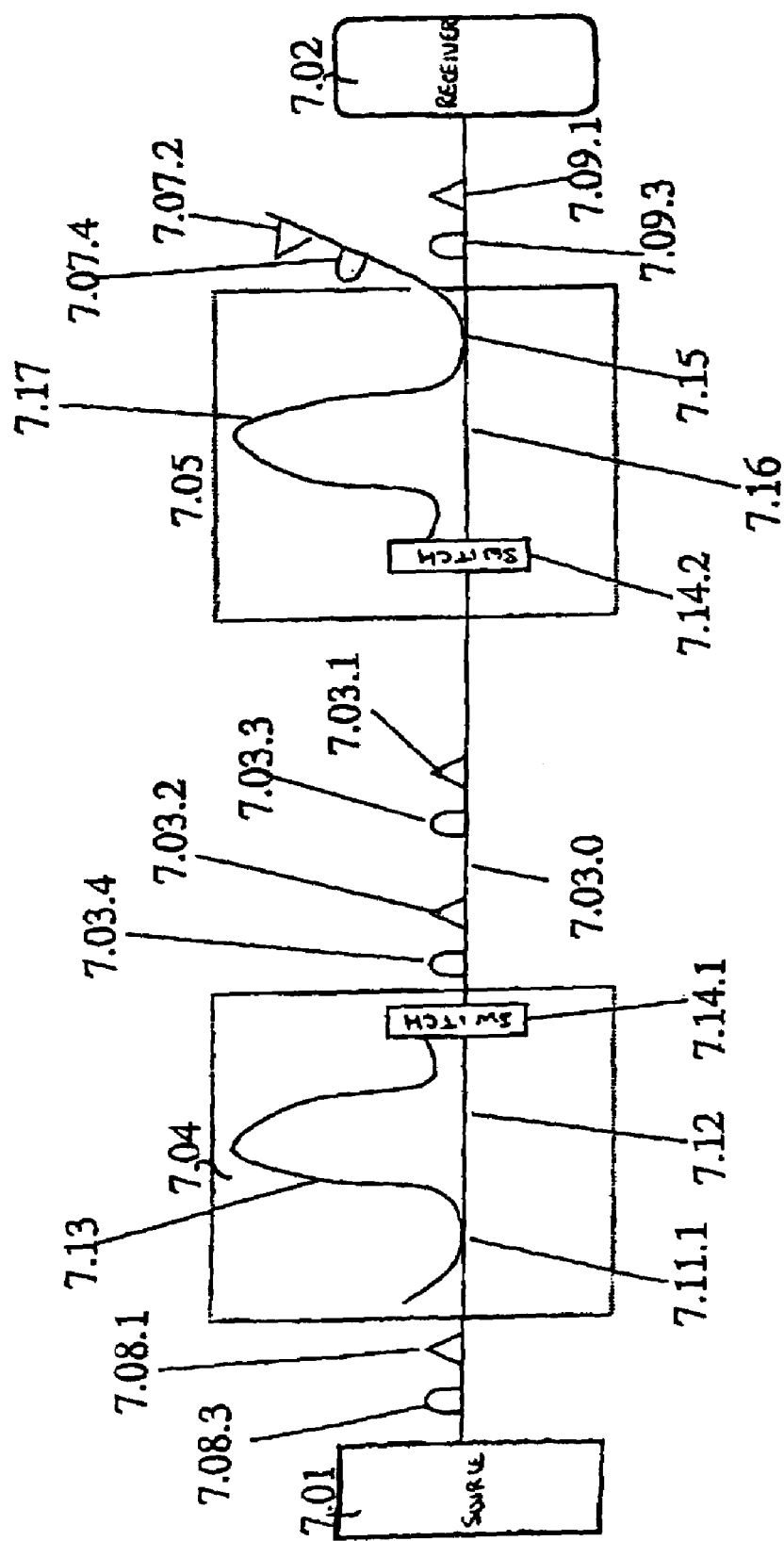
FIG. 7—Example of the implementation of the simple error filtration protocols using time bins in optical fibres.

This is illustrated in FIG. 7. In this implementation the signal is sent through optical fibres. However, rather than being sent through multiple physical fibres as in the implementations in section 3.1, the signals are sent through a single fibre, but the different components of the signal are encoded in different time-bins. This implementation is based on the recent realisation that one can easily manipulate signals propagating in optical fibers and distributed in time bins (J. Brendel, W. Tittel, H. Zbinden and N. Gisin, Phys. Rev. Lett. 82, 2594, 1999). We refer to this reference for a description of how to realise a source that emits a signal in different time bins.

As in the examples in the previous sections, for concreteness we consider the case in which there are two source basis states which we will refer to as source channels and four transmission basis states (channels). The source 7.01 sends signals along the fibre in two time bins. To make it easier to see how the implementation works we have drawn these two signals as a round blob 7.08.3 and a triangular one 7.08.1.

The encoding is performed by the single encoder 7.04. The encoder has one short arm 7.12 and one long arm 7.13. A signal arriving at the encoder first passes through the optical coupler 7.11.1 and has amplitude $1/\sqrt{2}$ of passing through the long or the short arm of the encoder. It then reaches a switch 7.14.1. This switch is synchronized with the source in such a way that it sends both the part of the signal that passed along the long arm of the encoder and the short arm of the encoder through the transmission optical fiber 7.03.0. The effect of the encoder is that any signal arriving at the encoder leaves it split into two time bins. The relative lengths of the optical paths in the two arms are arranged so that the time separation of the two time bins is greater than the time separation of the two incoming bins (this simplifies the switching in the decoder—see below). The result of this encoding is that the original signal in two time bins emerges in four time bins 7.03.1-7.03.4 and the signal then travels along the noisy transmission fibre in these four time bins.

There is a single physical decoder, 7.05. It has a switch 7.14.2 at the incoming end, one short path 7.16 and one long one 7.17, and an optical coupler 7.15 (with transmission and coefficients of $1/\sqrt{2}$) at the output end. The optical path lengths along the arms of the decoder are arranged to be the same as that of the corresponding arms of the encoder. The two first signal components to arrive at the decoder (i.e. those which went along the short path in the encoder) are sent along the long path; the switch is then thrown so that the second pair of signals is sent through the short arm of the decoder. Thus the switch must be timed with the known optical lengths of the different paths. The decoder has the effect of re-combining signals into two time bins. The signal is collected at the receiver 7.02; the useful channels are 7.09.1 and 7.09.3; the signals appearing at the other two channels, 7.07.2 and 7.07.4, are pure noise and are discarded.

An advantage of this scheme is that it does not require us to stabilize an interferometer over the whole transmission line. Only the difference in optical length between the short and long arm of the coder and decoder must be kept constant. On the other hand this scheme requires a non-linear element, namely the switches. If one replaces the switches by couplers with $1/\sqrt{2}$ transmission coefficients, then the scheme continues to work, but each particle has probability ¾ of being discarded (and the receiver must be able to discriminate on the basis of time of arrival whether to accept the particle or discard it).

As in the implementations in the previous sections, this hardware can be used for many of the protocols we describe in the text: single photon quantum signals, states with internal degrees of freedom, multi-photon quantum states and classical signals.

In the case of single photon quantum states the two source time-bins (channels) carry the states $|1>_S$ and $|3>_S$ (for consistency with the notation in the text) and the four transmission time-bins carry the states $|i>_T$, i=1 . . . 4. The state of the photon in the source time-bins 7.08.1 and 7.08.3 is $a|1>_S+b|3>_S$ where, as before, a and b are complex numbers, $|a|^2+|b|^2=1$. The state emerging from the encoder 7.04 is $$\frac{a}{\sqrt{2}}(|1\rangle_T + |2\rangle_T) + \frac{b}{\sqrt{2}}(|3\rangle_T + |4\rangle_T).$$

The signal then travels along the noisy transmission line in the four time-bins 7.03.1-7.03.4. The decoder causes the transformations $$|1\rangle_T \mapsto \frac{1}{\sqrt{2}}(|1\rangle_R - |2\rangle_R) \text{ and } |2\rangle_T \mapsto$$

$$\frac{1}{\sqrt{2}}(|1\rangle_R + |2\rangle_R) \text{ and } |3\rangle_T \mapsto \frac{1}{\sqrt{2}}(|3\rangle_R - |4\rangle_R)$$

and $$|4\rangle_T \mapsto \frac{1}{\sqrt{2}}(|3\rangle_R + |4\rangle_R).$$

The states in the useful time-bins 7.09.1 and 7.09.3 are $|1>_S$ and $|1>_R$ respectively.

Filtration of the other types of signal listed above works in very similar ways, as described in detail in part 2; we do not repeat the mathematical description here.

As before we note that we have not made use of any internal degrees of freedom of the signals in the example in this section. In the case of single photon states we could slightly change the implementation encoding the signal in the two polarisation states $|V>$ and $|H>$ of the photon. Thus using these internal degrees of freedom we need only have one source time-bin and two transmission time-bins. The signal could be encoded as $a|V>_S+b|H>_S$. As long as the noise for all four components of the transmission signal (up and down polarization in each of two time-bins) is independent, the protocol will work exactly as above.

3.4 Example of the Implementation of the Simple Error Filtration Protocols Using Time-bins in Free Space.

Figure 8:
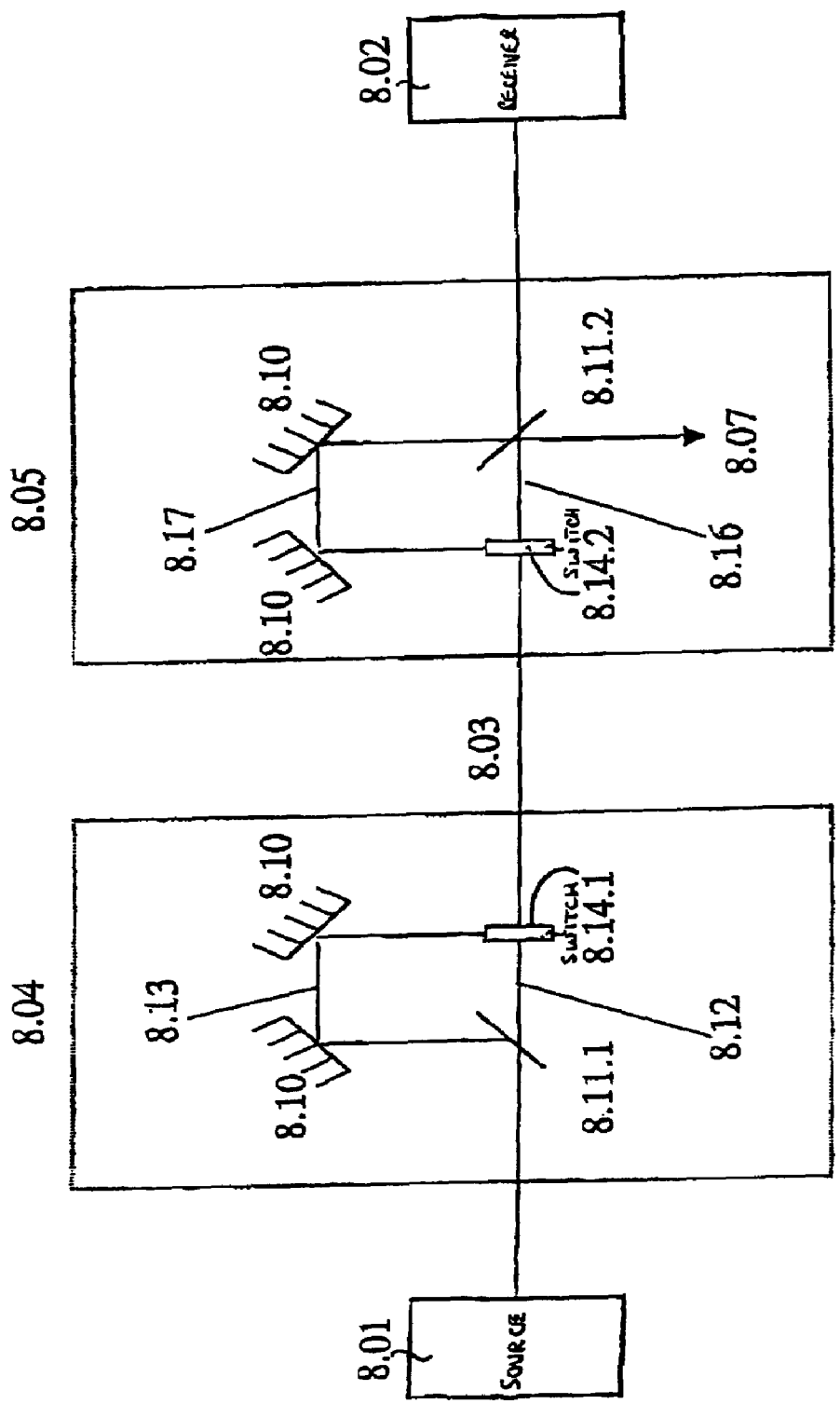
FIG. 8—Example of the implementation of the simple error filtration protocols using time bins in free space.

This is illustrated in FIG. 8. Just as there is a free space analogue section 3.2 of the multi-fibre protocol in section 3.1, there is a free space analogue of the implementation in the previous section, using time-bins. The principle of the implementation in this section is very similar to that in the previous section, but the hard-ware is different.

As in the examples in the previous section, for concreteness we consider the case in which there are two source basis states (channels) and four transmission basis states (channels). The source 8.01 sends signals in free-space in two time bins. The encoding is performed by the single encoder 8.04. The encoder has one short arm 8.12 and one long arm 8.13. A signal arriving at the encoder reaches the beam-splitter 8.11.1 and is distributed through the two arms of the encoder. Mirrors 8.10 are needed to direct the photon to switch 8.14.1 which completes the encoding. As in the implementation in the previous section, the effect of the encoder is that any signal arriving at the encoder leaves it split into two time bins; again the relative lengths of the optical paths in the two arms are arranged so that the time separation of the two time bins is greater than the time separation of the two incoming bins. The result of this encoding is that the original signal in two time bins emerges in four time bins and the signal then travels in free space in these four time bins 8.03; during this travel there is noise. There is a single physical decoder, 8.05. It has a switch 8.14.2 at the incoming end, one short path 8.16 and one long one 8.17, and an beam-splitter at the output end 8.11.2. The optical path lengths along the arms of the decoder are arranged to be the same as that of the corresponding arms of the encoder. The two first signal components to arrive at the decoder (i.e. those which went along the short path in the encoder) are sent along the long path; the switch is then thrown so that the second pair of signals is sent through the short arm of the decoder. The switch must be timed with the known path lengths of the entire optical paths. The decoder has the effect of re-combining signals into two time bins.

The signal is collected at the receiver 8.02; any signals appearing at 8.07 are pure noise and are discarded.

As in the implementations in the previous sections, this hardware can be used for many of the protocols we describe in the text: single photon quantum signals, states with internal degrees of freedom, multi-photon quantum states and classical signals.

The description of the state at each stage in the implementation of any protocol is exactly as in the previous section.

We note as before that we have not made use of any internal degrees of freedom of the signals in the example in this section and that this may be done, hence reducing the number of time bins necessary.

3.5 Example of the Implementation of the Protocol for Distribution of Entangled States in Multiple Optical Fibres.

Figure 9:
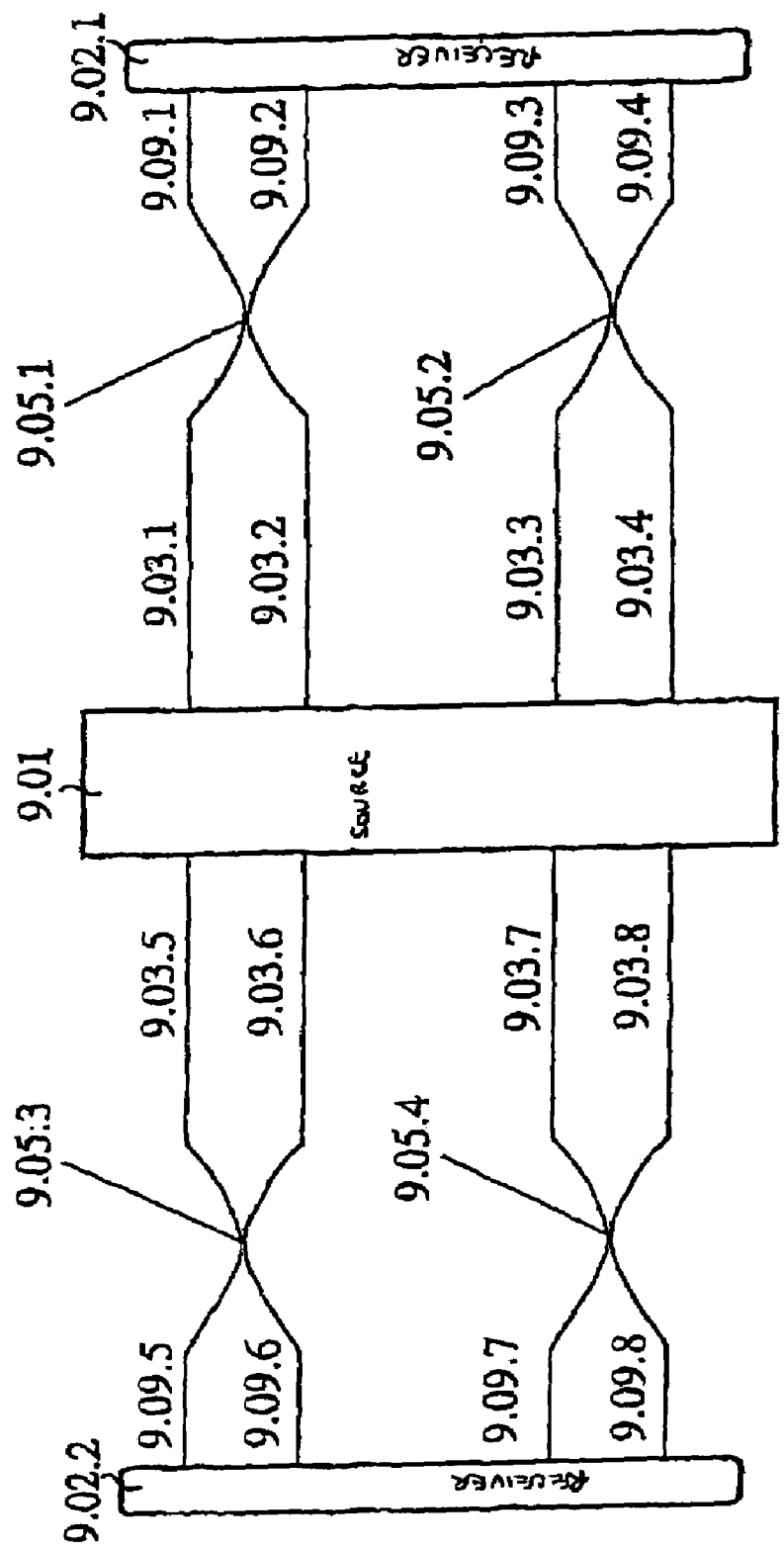
FIG. 9—Example of the implementation of the protocol for distribution of entangled states in multiple optical fibres.

This is illustrated in FIG. 9. This implementation is of the protocol in section 2.16.1 which uses multiplexing at the source. The goal is to provide the receivers A and is B (9.02.1 and 9.02.2 respectively) with a state which is as close as possible to a maximally entangled state. For concreteness we consider the case in which the receivers wish to share a maximally entangled state of two 2-level systems, and where there are four source channels emerging towards each receiver. We recall that in this case there is no encoding therefore that there are also four transmission channels. The signal leaves the source and then travels along the noisy transmission fibres 9.03.1-9.03.8. The optical length of each pair of tranmission fibers (for instance 9.03.1 and 9.03.2) must be equal. The decoders, 9.05.1-9.05.4, are optical couplers with $1/\sqrt{2}$ transmission amplitudes. The signal is collected at the receivers 9.02.1 and 9.02.2. Each receiver collects the signal arriving at two channels and the receivers must collect the signals arriving at correlated channels. Thus for example receiver 9.02.1 could collect the signal arriving in channels 9.09.1 and 9.09.3 in which case receiver 9.02.2 should collect the signals arriving in channels 9.09.5 and 9.09.7.

In this implementation of the protocol in section 2.16.1 the photons leave the source in state $$\frac{1}{2}(|1\rangle_S^A|1\rangle_S^B + |2\rangle_S^A|2\rangle_S^B + |3\rangle_S^A|3\rangle_S^B + |4\rangle_S^A|4\rangle_S^B). \tag{170}$$

Since the encoding is trivial, the state entering the noisy fibres is $$\frac{1}{2}(|1\rangle_T^A|1\rangle_T^B + |2\rangle_T^A|2\rangle_T^B + |3\rangle_T^A|3\rangle_T^B + |4\rangle_T^A|4\rangle_T^B). \tag{171}$$

The signal then travels along the noisy transmission fibres 9.03.1-9.03.8. The signals entering decoder 9.05.1 are $|1\rangle_T^A$ and $|2\rangle_T^A$, and the decoder causes the transformations $$|1\rangle_T^A \mapsto \frac{1}{\sqrt{2}}(|1\rangle_R^A - |2\rangle_R^A) \text{ and } |2\rangle_T^A \mapsto \frac{1}{\sqrt{2}}(|1\rangle_R^A + |2\rangle_R^A).$$

Similarly the other decoders 9.05.2-9.05.4 cause the transformations $$|3\rangle_T^A \mapsto \frac{1}{\sqrt{2}}(|3\rangle_R^A - |4\rangle_R^A)$$

and $$|4\rangle_T^A \mapsto \frac{1}{\sqrt{2}}(|3\rangle_R^A + |4\rangle_R^A); |1\rangle_T^B \mapsto \frac{1}{\sqrt{2}}(|1\rangle_R^B - |2\rangle_R^B - |2\rangle_R^B) \text{ and}$$

$$|2\rangle_T^B \mapsto \frac{1}{\sqrt{2}}(|1\rangle_R^B + |2\rangle_R^B); |3\rangle_T^B \mapsto \frac{1}{\sqrt{2}}(|3\rangle_R^B - |4\rangle_R^B) \text{ and}$$

$$|4\rangle_T^B \mapsto \frac{1}{\sqrt{2}}(|3\rangle_R^B + |4\rangle_R^B).$$

The receivers collect the states $|1\rangle_R^A$, $|3\rangle_R^A$, $|1\rangle_R^B$ and $|3\rangle_R^B$ which appear in channels 9.09.1, 9.09.3, 9.09.5 and 9.09.7. The receivers will also collect error-filtered entangled states if they collect the complementary states $|2\rangle_R^A$, $|4\rangle_R^A$, $|2\rangle_R^B$ and $|4\rangle_R^B$ which appear in the other receiver channels. It may be checked that these choices of the decoding operation and the states which are collected satisfy the three conditions of section 2.16.1.

Figure 13:
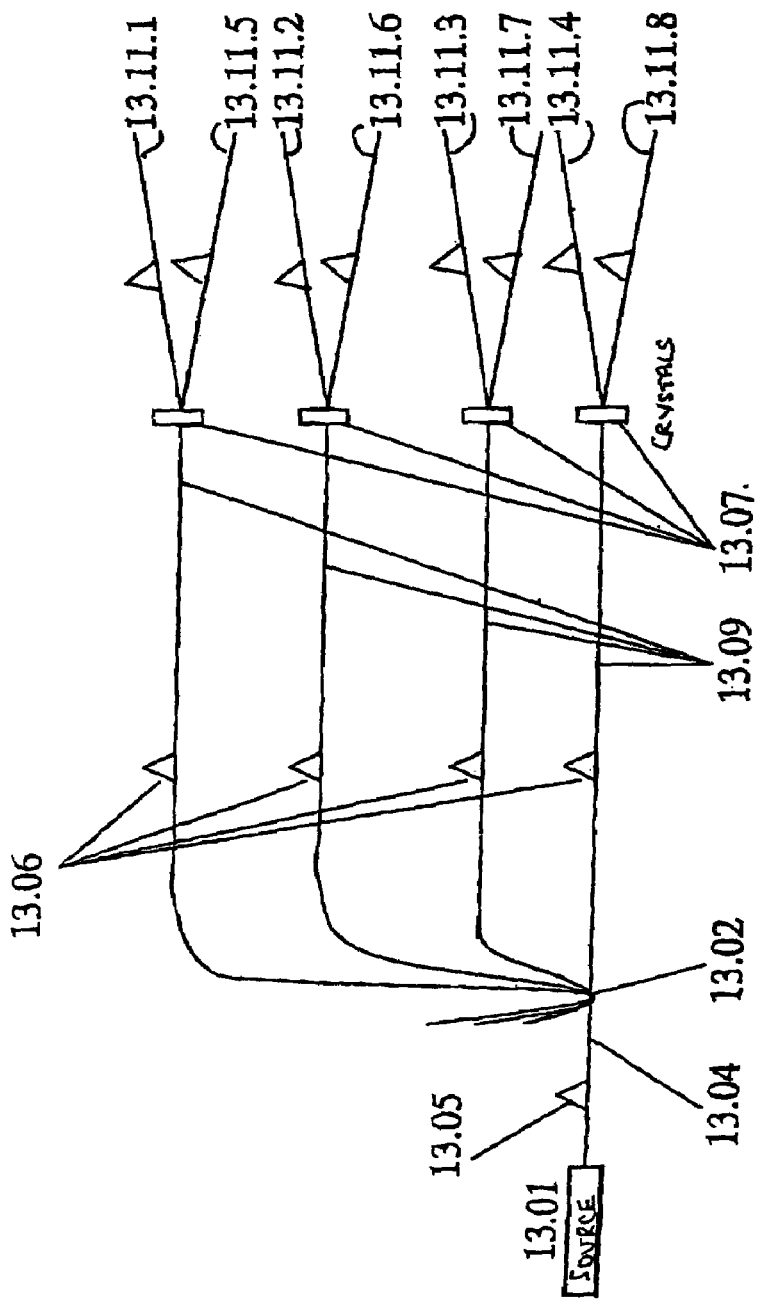
FIG. 13—Example of source of entangled states in optical fibres.

An example of an arrangement for a source which can be used in this protocol is given in FIG. 13. A laser 13.01 sends a UV pulse 13.05 along an optical fibre 13.04. It reaches a coupler 13.02 generating four pulses 13.06 each travelling on one of the four optical fibres 13.09 of equal optical length. The four pulses 13.06 reach four non-linear crystals 13.07 simultaneously. Each pulse generates 2 optical photon pulses. The four upper fibres 13.11.1-13.11.4, one emerging from each crystal correspond to the four fibres 9.03.1-9.03.4 in FIG. 9. The four lower fibres 13.11.5-13.11.8, one emerging from each crystal correspond to the four fibres 9.03.5-9.03.8 in FIG. 9.

The whole set up may also be implemented in free-space rather than using optical fibres, exactly as the one-way communication protocols could be implemented in fibres or free-space. As before mirrors are needed to direct the photons and the optical couplers will be replaced by beam-splitters.

We note again that we have not made use of any internal degrees of freedom of the signals in the above examples. We could slightly change the implementation to make use of the two polarisation states of the photon. Thus using these internal degrees of freedom reduces the number of physical fibres. As long as the noise for all components of the transmission signal is independent, the protocol will work exactly as above.

3.6 Example of the Implementation of the Protocol for Distribution of Entangled States in Time-bins in Optical Fibres.

Figure 10:
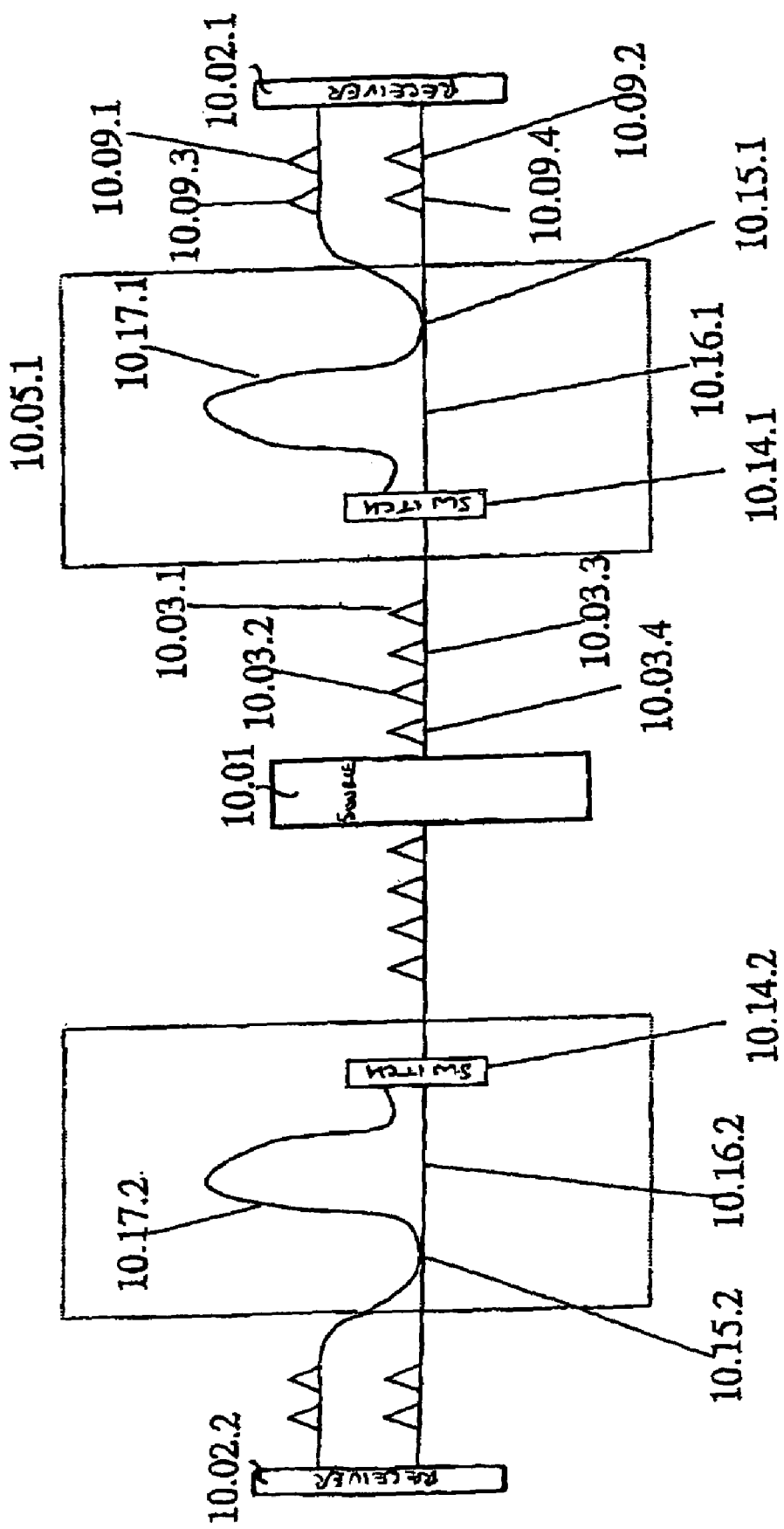
FIG. 10—Example of the implementation of the protocol for distribution of entangled states in time bins in optical fibres.

This is illustrated in FIG. 10. This implementation is of the same protocol as in the previous section namely using multiplexing at the source. However, rather than using multiple fibres as in the previous protocol, the signal is encoded in multiple time bins. As before the goal is to provide the receivers A and B (10.02.1 and 10.02.2 respectively) with a state which is as close as possible to a maximally entangled state. Again we consider the case in which the receivers wish to share a maximally entangled state of two 2-level systems. We consider the case that there are four source time-bins travelling towards each receiver. As before, there is no encoding therefore there are also four transmission time-bins. Note that it was shown in Brendel et al. Phys Rev Lett 82 (1999) 2594, how to realise experimentally a source of entangled states in multiple time bins.

Let us consider the signal travelling towards receiver A; the description of the signal travelling to B is identical. The signal leaves the source and then travels along the noisy transmission fibre in four time bins 10.03.1-10.03.4. There is a single physical decoder in this part of the apparatus, 10.05.1. It has a switch 10.14.1 at the incoming end, one short path 10.16.1 and one long one 10.17.1, and an optical coupler at the output end 10.15.1. The optical path lengths along the arms of the decoder are arranged to be the same as that between time bins 10.03.1 and 10.03.2 which is the same as that between 10.03.3 and 10.03.4. The two first signal components to arrive at the decoder are sent along the long path; the switch is then thrown so that the second pair of signals is sent through the short arm of the decoder. The switch must be timed with the known path lengths of the entire optical paths. The decoder has the effect of re-combining signals into two time bins along each output fibre from the coupler. The signal is collected at the receiver 10.02.1; if this receiver collects the two time bins 10.09.1 and 10.09.3, then the other receiver must collect the corresponding time bins on its side.

The description of the states and transformations performed by the apparatus are precisely analogous to that in the previous section and need not be repeated.

Figure 12:
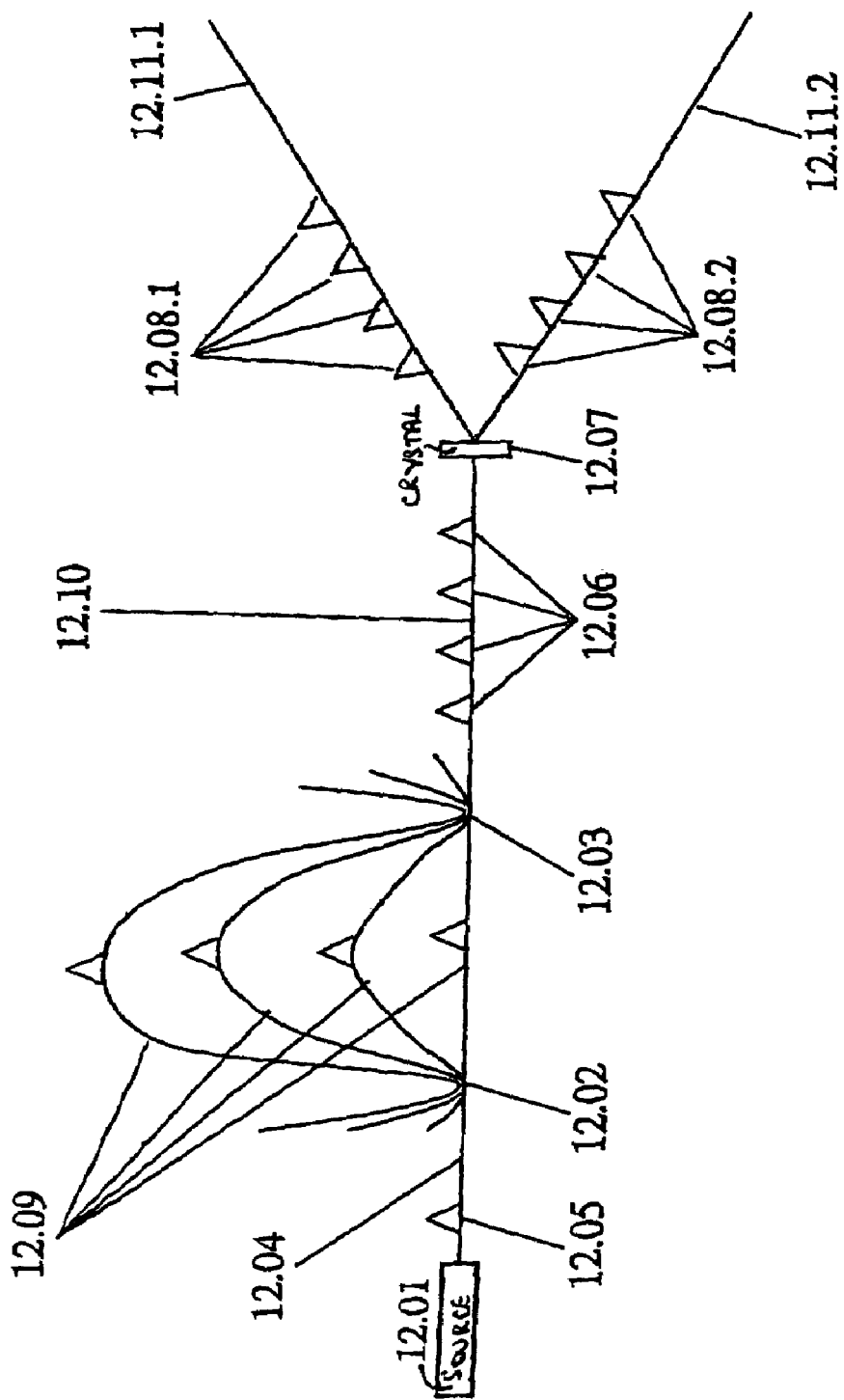
FIG. 12—Example of source of entangled states in time bins.

An example of a source which can be used in this protocol was described in Brendel et al. Phys Rev Lett 82 (1999) 2594, and is illustrated in FIG. 12. A laser 12.01 emits an UV pulse 12.05 along an optical fibre 12.04. An optical coupler 12.02 connects 4 optical fibres 12.09 of different optical lengths. The original pulse is split into 4 pulses, one travelling along each of the fibres 12.09. The fibres are recoupled at the coupler 12.03. Four pulses will emerge from the coupler and travel along fibre 12.10. The pulses reach a non-linear crystal 12.07. At the crystal each of the four pulses 12.06 generates 2 optical photon pulses, one travelling along fibre 12.11.1 and the other along 12.11.2. Thus a total of 8 pulses are generated by the four pulses 12.06. The set of four pulses 12.08.1 are used as the signal pulses 10.03.1-10.03.4 sent towards receiver 10.02.1 in FIG. 10, the other four pulses 12.08.2 are used as the signal pulses sent towards receiver 10.02.2 in FIG. 10.

Also, as described in the previous section, the whole set up may also be implemented in free-space rather than using optical fibres, exactly as the one-way communication protocols could be implemented in fibres or free-space. As before mirrors are needed to direct the photons and the optical couplers will be replaced by beam-splitters.

We note again that we have not made use of any internal degrees of freedom of the signals in the above examples. We could slightly change the implementation to make use of the two polaxisation states of the photon. Thus using these internal degrees of freedom reduces the number of time-bins needed. As long as the noise for all components of the transmission signal is independent, the protocol will work exactly as above.

3.7 The Implementation of the Second Protocol for Distribution of Entangled States.

We simply note here that, as was made clear in the text in section 2.16, any of the one-way communication protocols which improve the transmission of quantum states may be used to improve the transmission of entangled states.

3.8 The Implementation of Protocols in Mesoscopic Quantum Systems.

We note that any of the previous implementations of protocols may be adapted to the use in mesoscopic systems, or indeed any other physical arena in which it is possible to perform quantum or classical wave information processing: the optical elements (fibres, couplers, beam-splitters etc.) are simply replaced by the element which performs the equivalent task in the mesoscopic or other domain.

In the case of mesoscopic implementations explicit descriptions of examples of physical elements which may be used to implement our protocols may be found in R. Ionicioiu et al quant-ph/9907043 and quant-ph/0011051 and references therein. For each optical element we have used in our protocols above, there corresponding nano-scale object; specifically a quantum nano-wire corresponds to the optical fibre and a electron wave-guide coupler or a symmetric tunneling junction correspond to a beam-splitter or optical coupler.

Figure 11:
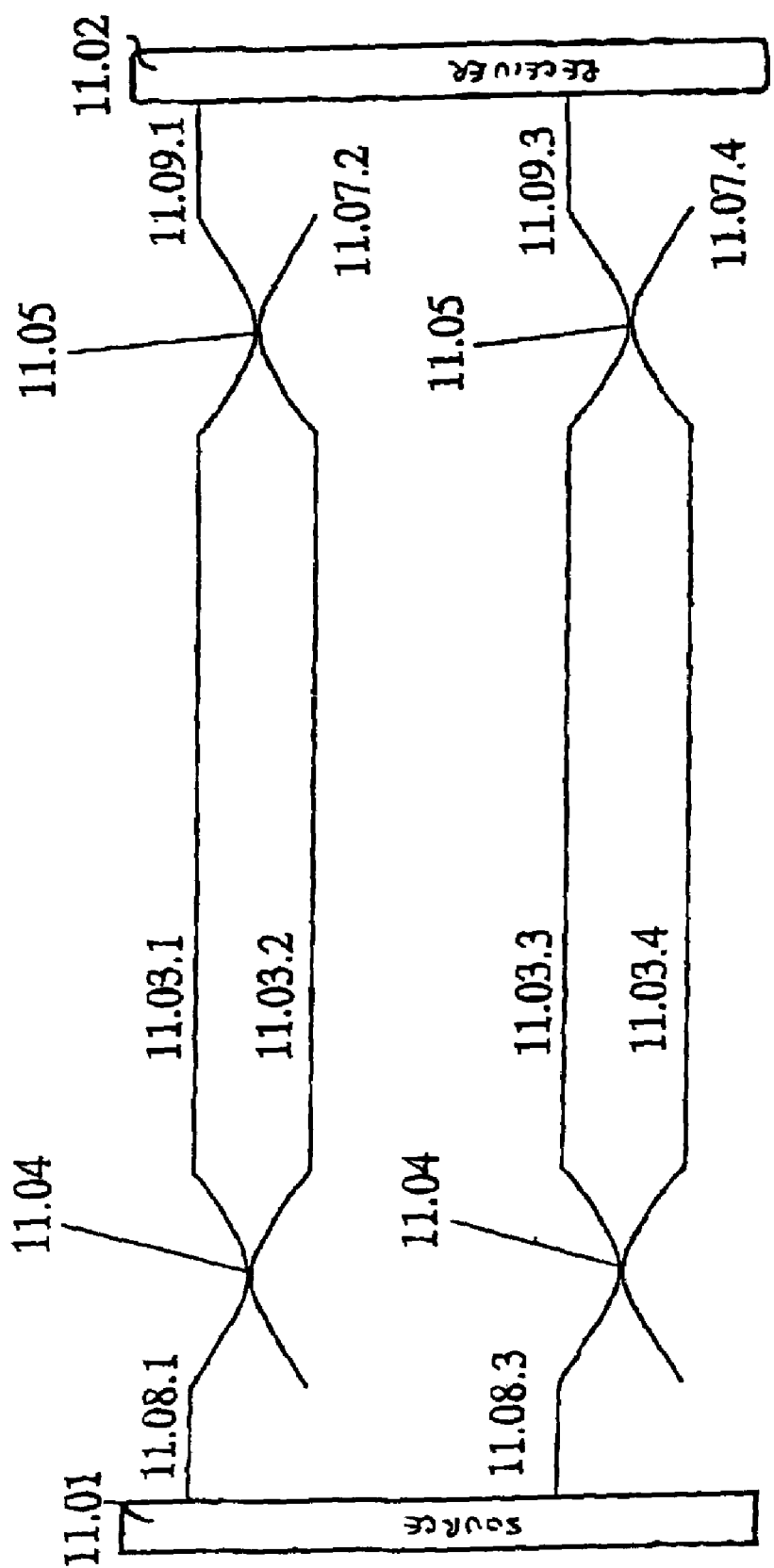
FIG. 11—Example of the implementation of the simple error filtration protocols in the mesoscopic domain.

FIG. 11 illustrates the implementation of the simplest protocol (section 2.6) in the mesoscopic domain. For concreteness we consider the case in which there are two source channels and four transmission channels. The source 11.01 sends signals down two nano-wires: the source channels 11.08.1 and 11.08.3. The encoding is performed by using nano-scale couplers as encoders 11.04. The signal then travels along the noisy transmission wires 11.03.1-11.03.4. The decoders, 11.05, are also nano-scale couplers. The signal is collected at the receivers 11.02; the useful channels are 11.09.1 and 11.09.3; the signals appearing at the other two channels, 11.07.2 and 11.07.4, are pure noise and are discarded. Note that the pairs of transmission wires 11.03.1 and 11.03.2 (or 11.03.3 and 11.03.4) constitute an interferometer. The transmission length of these two wires must be equal so that in the absence of noise a signal emitted by the source in wire 11.08.1 (or 11.08.3) is recovered with certainty in wire 11.09.1 (or 11.09.3).

This hardware can be used for many of the protocols we describe in the text: single electron quantum signals, states with internal degrees of freedom, multi-particle quantum states and classical currents.

The invention claimed is:
1. A method of handling information in a noisy environment in the form of at least one information carrying mode, comprising the steps of:
   generating a plurality of encoded modes by linear transformation of the information carrying mode, said encoded modes being provided on respective independent channels;

linearly combining the encoded modes to generate at least one decoded mode;

providing a set of receiver channels for receiving the decoded mode wherein one of said set of receiver channels is designated as a useful channel; and supplying as a useful signal the decoded mode if it is received on the useful channel and discarding the decoded mode if it is received on the other receiver channels of the set, wherein the useful signal represents said information substantially uncorrupted by noise.

2. A method according to claim 1, wherein the linear transformation for generating the plurality of encoded modes is a unitary transformation and wherein the step of linearly combining the encoded modes is implemented by a unitary transformation.

3. A method according to claim 2, wherein the unitary transformation is selected from the class of transformation protocols including a Fourier transform, an inverse Fourier transform, and a Hadamard transformation.

4. A method according to claim 1, when implemented with a plurality of information carrying modes, the number of encoded modes in the plurality of encoded modes generated by linear transformation of the information carrying modes being greater than or equal to the number of information carrying modes.

5. A method according to claim 4, in which a plurality of useful channels are designated, the number of decoded modes in the designated useful channels being the same as the number of information carrying modes.

6. A method according to claim 1, when used to transmit information from a source to a destination.

7. A method according to claim 1, which is used to store information by retaining the plurality of encoded modes in a storage device prior to the step of linearly combining the encoded modes.

8. A method according to claim 1, wherein the encoded modes are subjected to a common non-trivial transformation in the independent channels.

9. A method according to claim 1, wherein for a number T of independent channels subject to independent noise in the noisy environment, the noise amplitude of the useful signal is reduced by a factor of $\sqrt{T}$.

10. A method according to claim 1 wherein, between a source and a destination, an operation comprising the steps of generating the plurality of encoded modes and linearly combining the encoded modes is carried out a plurality of times, the at least one decoded mode from one operation being used as the information carrying mode in a subsequent operation.

11. A method according to claim 1, wherein the independent channels are physically spatially separate.

12. A method according to claim 1, wherein the independent channels are temporally separate, wherein each encoded mode occupies a respective time slot.

13. A method according to claim 1, wherein the modes represent classical wave signals.

14. A method according to claim 13, wherein the classical wave signals are optical signals.

15. A method according to claim 1, wherein one of said encoded modes represents a first polarisation state of photons and another of said encoded modes represents a second polarisation state of photons.

16. A method according to claim 1, where each channel carries one or more modes, the number of said modes being the number of internal degrees of freedom.

17. A method according to claim 1, wherein each mode comprises a set of states, each state being a state of zero, one or more particles, the step of linearly combining the encoded modes causing the set of states including the particles contained therein to be generated as said at least one decoded mode.

18. A method according to claim 17, wherein at least some of said modes are in a superposition of said states with zero, one or more particles.

19. A method according to claim 17, wherein the quantum states are one of the following: single particle quantum states, multi-particle quantum states, entangled quantum states.

20. A method according to claim 1, wherein the states are quantum or classical states of bosons or fermions.

21. A system for handling information in a noisy environment in the form of at least one information carrying mode, the system comprising:

means for generating a plurality of encoded modes by linear transformation of the information carrying mode, said encoded modes being provided on respective independent channels;

means for linearly combining the encoded modes to generate at least one decoded mode;

a set of receiver channels for receiving the at least one decoded mode wherein one of said set of receiver channels is designated as a useful channel; and means for supplying as a useful signal the decoded mode if it is received on the useful channel and discarding the decoded mode if it is received on the other receiver channels of the set, wherein the useful signal represents said information substantially uncorrupted by noise.

22. A system according to claim 21, wherein said generating means and linearly combining means implement unitary transforms.

23. A system according to claim 22, wherein the respective independent channels constitute a storage device for holding the encoded modes in such a manner that they are accessible by the linearly combining means.

24. A system according to claim 23, wherein the independent channels take the form of storage coils.

25. A system according to claim 21, which further comprises means for transmitting the encoded modes from said generating means to said linearly combining means.

26. A system according to claim 21, wherein the respective independent channels are provided by physically separate transmission paths.

27. A system according to claim 21, wherein the means for generating the plurality of encoded modes comprises means for generating said modes in separate time slots in a common physical communication path, each time slot providing one of said respective independent channels.

28. A system according to claim 21, wherein the modes are optical signals and wherein the means for generating the plurality of encoded modes and the linearly combining means are optical components.

29. A system according to claim 28, wherein each respective independent channel is provided by an optical fibre.

30. A system according to claim 29, wherein the optical fibres have equal optical lengths.

31. A system according to claim 28, wherein the respective independent channels are provided by free space.

32. A system according to claim 21, which comprises transforming means for subjecting the encoded modes in the independent channels to a common non-trivial transformation.

33. A system according to claim 32, wherein the transforming means comprises a logic gate.

34. A system according to claim 21, which comprises additional generating means arranged to generate subsequent encoded modes by linear transformation of the at least one decoded mode and additional linearly combining means for combining said subsequent encoded modes.

35. A method of generating states of quantum particles correlated to a predetermined degree at separated locations in a noisy environment, the method comprising:
generating a first set of transmission sub-states of a first particle and a second set of transmission sub-states of a second particle, the transmission sub-states representing a greater degree of correlations than the predetermined degree;
transmitting the first set of transmission sub-states on respective ones of a first plurality of independent transmission channels;
transmitting the second set of transmission sub-states on respective ones of a second plurality of independent transmission channels;
combining the first set of transmission sub-states to generate receiver states of the first particle on respective ones of a first set of output channels;
combining the second set of transmission sub-states to generate receiver states of the second particle on respective ones of a second set of output channels;
determining whether or not to use or discard the states of the first and second particles depending on the output channels in which they arrive, wherein the states of the first and second particles which are determined to be used are available on corresponding channels of the first and second sets and are correlated to said predetermined degree.

36. A method according to claim 35, wherein the steps of combining the first set of transmission sub-states and combining the second set of transmission sub-states are implemented using unitary transforms.

37. A method according to claim 36, wherein the step of combining the first set of transmission sub-states and the step of combining the second set of transmission sub-states are implemented using inverse Fourier transforms.

38. A method according to claim 36, wherein the unitary transforms are Hadamard transforms.

39. A method according to claim 35, wherein the independent transmission channels for transmission of the transmission sub-states of the first and second sets are provided by physically independent communication paths.

40. A method according to claim 35, wherein the independent transmission channels for transmitting the transmission sub-states of the first and second sets are provided by separate time slots in common physical communication paths for each of the first and second sets.

41. A system for generating states of quantum particles correlated to a predetermined degree at separated locations in a noisy environment, the system comprising:
a source configured to generate a first set of transmission sub-states of a first particle and a second set of transmission sub-states of a second particle, the transmission sub-states representing a greater degree of correlation than the predetermined degree;
a first plurality of transmission paths arranged between the source and a first decoder for conveying respectively the first set of transmission sub-states;
a second plurality of transmission paths arranged between the source and a second decoder for conveying respectively the second set of transmission sub-states;
wherein the first decoder is operable to combine the transmission sub-states to generate receiver states of the first particle on respective ones of a first set of output channels;
wherein the second decoder is operable to combine the transmission sub-states to generate receiver states of the second particle on respective ones of a second set of output channels; and
means for determining whether or not to use or discard the states of the first and second particles depending on the output channels in which they arrive, wherein the states of the first and second particles which are determined to be used are available on corresponding channels of the first and second sets and are correlated to said predetermined degree.

42. A system according to claim 41, which comprises a first detector for detecting in which of the output channels the receiver states are generated; and
a second detector for detecting in which of the output channels the receiver states of the second particle are generated.

43. A system according to claim 41, wherein the independent transmission channels are optical paths and wherein the first and second decoders are optical components.

* * * * *

UNITED STATES PATENT AND TRADEMARK OFFICE
CERTIFICATE OF CORRECTION

PATENT NO. : 7,266,303 B2 Page 1 of 1
APPLICATION NO. : 10/398637
DATED : September 4, 2007
INVENTOR(S) : Noah Linden et al.

It is certified that error appears in the above-identified patent and that said Letters Patent is hereby corrected as shown below:

On the Title Page Item (73) Assignees:   Universite Libre de Bruxelles, Brussels (BE);

Insert   Universite de Geneve, Geneve (CH)

Signed and Sealed this

Eighteenth Day of March, 2008

JON W. DUDAS
*Director of the United States Patent and Trademark Office*